(12) United States Patent
Hong et al.

(10) Patent No.: US 9,649,791 B2
(45) Date of Patent: May 16, 2017

(54) OPTICAL FILM AND METHOD OF PREPARING OPTICAL FILM

(71) Applicant: SAMSUNG ELECTRONICS CO., LTD., Suwon-si, Gyeonggi-do (KR)

(72) Inventors: Sung Woo Hong, Seoul (KR); Woo-Jin Bae, Yongin-si (KR); Chan Jae Ahn, Hwaseong-si (KR); Won Suk Chang, Hwaseong-si (KR); A ra Jo, Euijeongbu-si (KR); Sung Won Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 446 days.

(21) Appl. No.: 14/251,789

(22) Filed: Apr. 14, 2014

(65) Prior Publication Data

US 2014/0349098 A1    Nov. 27, 2014

(30) Foreign Application Priority Data

May 27, 2013   (KR) ........................ 10-2013-0059945

(51) Int. Cl.

| | |
|---|---|
| *B29C 41/46* | (2006.01) |
| *C08G 73/14* | (2006.01) |
| *B29D 11/00* | (2006.01) |
| *B29C 41/00* | (2006.01) |
| *C08L 79/08* | (2006.01) |
| *B29C 39/00* | (2006.01) |
| *C09D 179/08* | (2006.01) |
| *C08G 73/10* | (2006.01) |
| *B29K 79/00* | (2006.01) |

(52) U.S. Cl.
CPC ............ *B29C 41/46* (2013.01); *B29C 39/003* (2013.01); *B29C 41/003* (2013.01); *B29D 11/00788* (2013.01); *C08G 73/1039* (2013.01); *C08G 73/1042* (2013.01); *C08G 73/1067* (2013.01); *C08G 73/14* (2013.01); *C08L 79/08* (2013.01); *C09D 179/08* (2013.01); *B29K 2079/08* (2013.01)

(58) Field of Classification Search
CPC ..... B29C 39/003; B29C 41/003; B29C 41/46; C08G 73/14; C08L 79/08
USPC .......................... 264/1.6, 2.6, 331.12, 331.19
See application file for complete search history.

(56) References Cited

U.S. PATENT DOCUMENTS

| | | | | |
|---|---|---|---|---|
| 4,542,257 A | * | 9/1985 | Fraser ............... | H01L 31/02167 136/244 |
| 4,639,485 A | * | 1/1987 | Frayer ................ | C08G 73/1032 524/104 |
| 5,147,966 A | * | 9/1992 | St. Clair ............ | C08G 73/1014 156/308.2 |
| 6,087,470 A | | 7/2000 | Liaw et al. | |
| 8,008,423 B2 | | 8/2011 | Kumar et al. | |
| 8,199,269 B2 | * | 6/2012 | Hattori ................ | H01L 27/1214 349/122 |
| 8,259,280 B2 | * | 9/2012 | Hattori .............. | G02F 1/133345 349/158 |
| 9,353,224 B2 | * | 5/2016 | Cho ........................ | C08G 73/14 |
| 9,365,694 B2 | * | 6/2016 | Cho .................... | C08G 73/1067 |
| 9,388,279 B2 | * | 7/2016 | Cho ........................ | C08G 73/14 |
| 2011/0196079 A1 | | 8/2011 | Jakupca et al. | |
| 2012/0296050 A1 | * | 11/2012 | Cho ........................ | C08G 73/14 525/436 |
| 2013/0202869 A1 | * | 8/2013 | Cho .......................... | C08J 7/06 428/220 |
| 2013/0203937 A1 | * | 8/2013 | Cho .................... | C08G 73/1039 524/600 |
| 2014/0031499 A1 | * | 1/2014 | Cho .................... | C08G 73/1067 525/431 |

FOREIGN PATENT DOCUMENTS

| | | |
|---|---|---|
| JP | 2007-231224 A | 9/2007 |
| KR | 1020030052299 A | 6/2003 |
| KR | 1020120045755 A | 5/2012 |

* cited by examiner

*Primary Examiner* — Atul P. Khare

(74) *Attorney, Agent, or Firm* — Cantor Colburn LLP

(57) ABSTRACT

A method of preparing an optical film, preparing a coating composition including an amic acid-containing polymer represented by Chemical Formula 1 and at least one polymerization aid selected from an alkyl phosphite, an aryl phosphite, an alkyl phosphate, and an aryl phosphate; providing the coating composition on a substrate to form a coating layer; and applying heat to the coating layer to prepare a cured film:

Chemical Formula 1

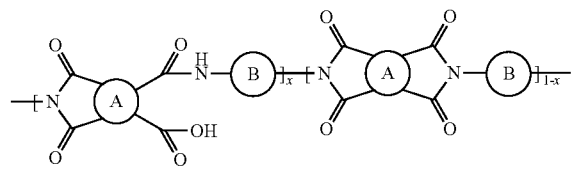

wherein, in Chemical Formula 1,

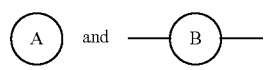

are the same or different in each repeating unit, and are each independently at least one selected from an aromatic organic group, an aliphatic organic group, and an alicyclic organic group, and $0 \leq x \leq 1$.

16 Claims, 7 Drawing Sheets

OPTICAL FILM AND METHOD OF PREPARING OPTICAL FILM

CROSS-REFERENCE TO RELATED APPLICATION

This application claims priority to Korean Patent Application No. 10-2013-0059945 filed on May 27, 2013, and all the benefits accruing therefrom under 35 U.S.C. §119, the content of which is incorporated herein in its entirety by reference.

BACKGROUND

1. Field

This disclosure relates to a method of preparing an optical film, and an optical film prepared by the method.

2. Description of the Related Art

A colorless transparent material has been utilized for diverse purposes such as for an optical lens, a functional optical film, and a disk substrate. As information devices are being further miniaturized and display devices are providing higher resolution, more functions and greater performance are desired from the colorless transparent material.

Therefore, there is an unmet need in development of a colorless transparent material having excellent transparency, heat resistance, mechanical strength, and flexibility.

SUMMARY

An embodiment provides a method of preparing an optical film.

Another embodiment provides an optical film having improved mechanical properties.

In an embodiment, a method of preparing optical film includes:

preparing a coating composition including an amic acid-containing polymer represented by the following Chemical Formula 1 and at least one polymerization aid selected from an alkyl phosphite, an aryl phosphite, an alkyl phosphate, and an aryl phosphate;

providing the coating composition on a substrate to form a coating layer; and applying heat to the coating layer to prepare a cured film.

Chemical Formula 1

[Chemical structure of Formula 1]

In the above Chemical Formula 1,

[Structure: A and B groups]

are the same or different in each repeating unit, and are each independently at least one selected from an aromatic organic group, an aliphatic organic group, and an alicyclic organic group, and $0 \leq x \leq 1$.

The coating composition may further include a chemical imidizing agent selected from an alkyl acid anhydride and an aryl acid anhydride.

The polymerization aid in the coating composition may be included in an amount of about 0.01 to about 100 mol % based on the total moles of amic acid in the amic acid-containing polymer.

The chemical imidizing agent in the coating composition may be included in an amount of less than or equal to about 100 mol %, for example about 0.01 to about 100 mol %, based on the total moles of amic acid in the amic acid-containing polymer.

The polymerization aid may be a trialkyl phosphite, a triaryl phosphite, a trialkyl phosphate, and a triaryl phosphate, and for example triisopropyl phosphite.

The chemical imidizing agent may be acetic anhydride.

In the above Chemical Formula 1,

[Structure: A and B groups]

may be the same or different in each repeating unit, and may be each independently at least one selected from a substituted or unsubstituted C4 to C20 carbocyclic group, a substituted or unsubstituted C6 to C20 monocyclic aromatic group, a substituted or unsubstituted C6 to C20 condensed polycyclic aromatic group, and a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —$SO_2$—, —C(=O)—, and —O—.

In the above Chemical Formula 1, x may be in the range of $0.05 < x \leq 0.9$, for example $0.2 < x \leq 0.7$.

The process of preparing the coating composition may include adding the polymerization aid to the amic acid-containing polymer, and the applying heat to the coating layer may include reacting a diamine with a dianhydride to prepare an amic acid-containing polymer of the above Chemical Formula 1.

The preparing a coating composition may further include adding a chemical imidizing agent selected from an alkyl acid anhydride and an aryl acid anhydride before adding the polymerization aid or upon adding the polymerization aid.

The diamine used in the process of reacting the diamine with the dianhydride to prepare the amic acid-containing polymer of the above Chemical Formula 1 may be selected from compounds represented by the following chemical formulae, and a combination thereof.

[Chemical structures showing diamine compounds with $H_2N$—$X^2$—...—$X^3$—$NH_2$ with $(R^{32})_{n35}$, and a second structure with $H_2N$, $NH_2$, $X^4$, $(R^{33})_{n36}$, $(R^{34})_{n37}$]

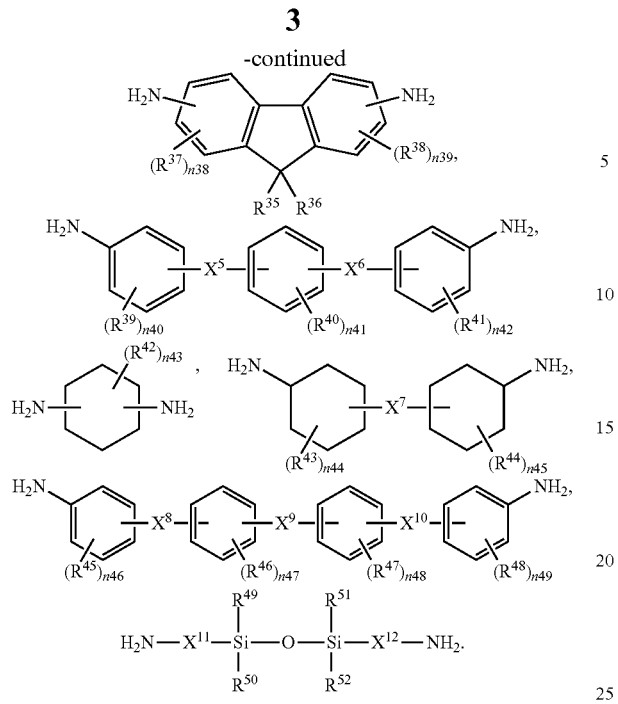

In the above chemical formulae, $R^{32}$ to $R^{52}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different and may each independently be a single bond, a substituted or unsubstituted C1 to C10 alkylene group, a substituted or unsubstituted C1 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —SO$_2$—, —O—, —C(=O)—, or a combination thereof, n35 to n37, and n40 to n49, are integers ranging from 0 to 4, and n38 and n39 are integers ranging from 0 to 3.

For example, the diamine may be selected from compounds represented by the following chemical formulae, and a combination thereof.

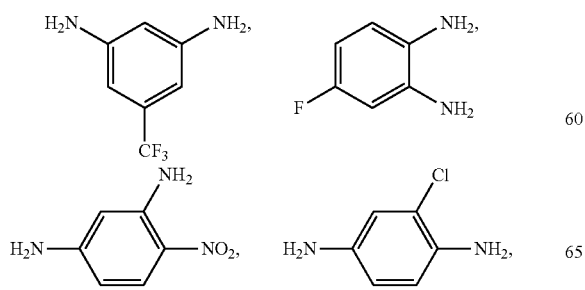

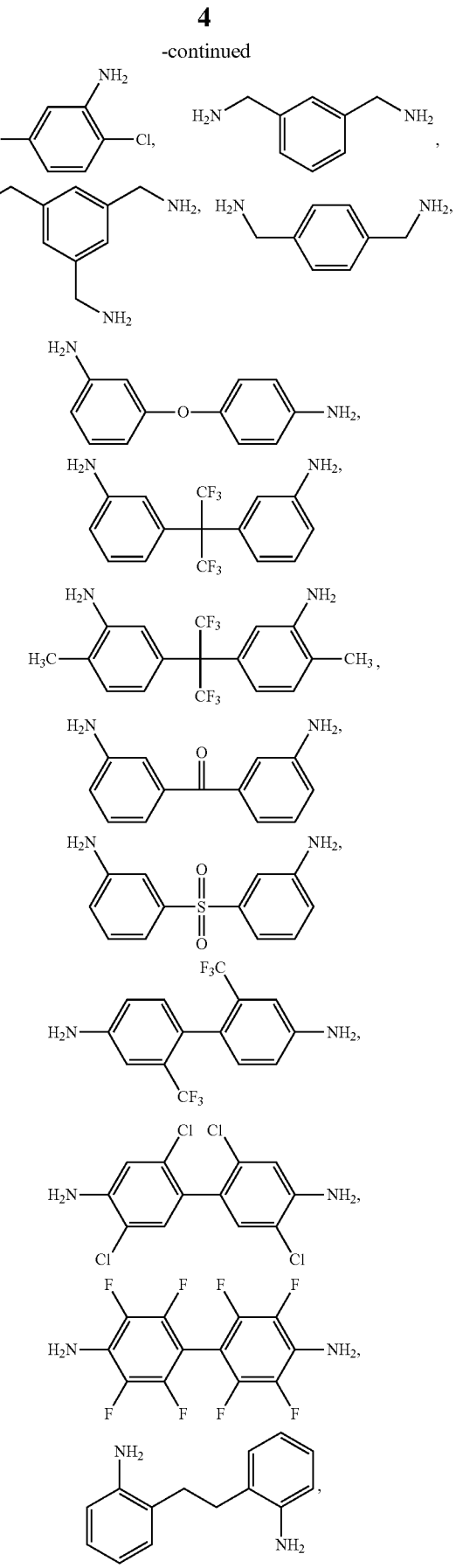

The dianhydride used in the process of reacting the diamine with dianhydride to prepare the amic acid-containing polymer of the above Chemical Formula 1 may be represented by the following Chemical Formula 2.

Chemical Formula 2

In the above Chemical Formula 2,
Cy is the same as (A) and ─(B)─ in the above Chemical Formula 1.

For example, the Cy of the above Chemical Formula 2 may be selected from a substituted or unsubstituted C4 to C20 carbocyclic group, a substituted or unsubstituted C6 to C20 monocyclic aromatic group, a substituted or unsubstituted C6 to C20 condensed polycyclic aromatic group, or a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —$SO_2$—, —C(=O)—, and —O—.

The dianhydride represented by the above Chemical Formula 2 may be at least one selected from 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), and 4-(2,5-dioxotetrahydrofuran-3-yl)-1,2,3,4-tetrahydronaphthalene-1,2-dicarboxylic anhydride (DTDA).

In another embodiment, a method of preparing an optical film includes:

preparing a coating composition including an amic acid-containing polymer represented by the above Chemical Formula 1, and at least one polymerization aid selected from an alkyl phosphite, an aryl phosphite, an alkyl phosphate, and an aryl phosphate;

solvent-casting the composition on a belt substrate to form a belt film in a direction of the belt substrate;

separating the belt film from the belt substrate; and applying heat to the belt film to prepare a cured film roll.

The applying heat to the belt film to prepare a cured film roll may be performed in a state in which the belt film is connected to a tenter.

The applying heat to the belt film to prepare a cured film roll may include applying heat the belt film at a temperature of about 150° C. to about 500° C., at a state wherein the belt film is connected to a tenter.

In addition, another embodiment provides an optical film prepared according to the method so that mechanical properties and optical properties are improved.

An optical film may include a product of polymerizing at least one diamine selected from compounds represented by chemical formulae and a combination thereof, and at least one dianhydride selected from 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride in the presence of at least one polymerization aid selected from an alkyl phosphite, an aryl phosphite, an alkyl phosphate, and an aryl phosphate to form a polymerized product, and curing the polymerized product:

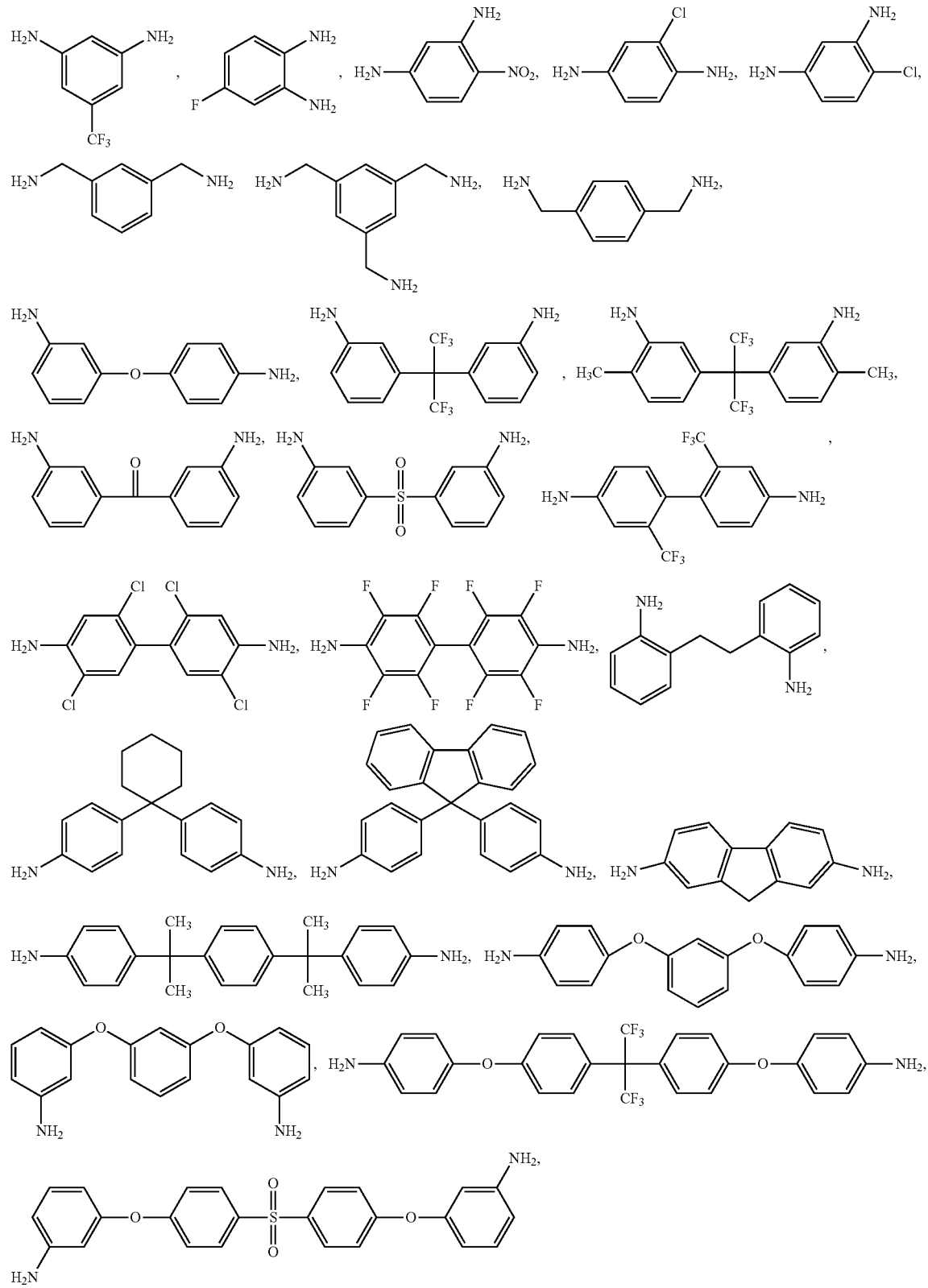

-continued

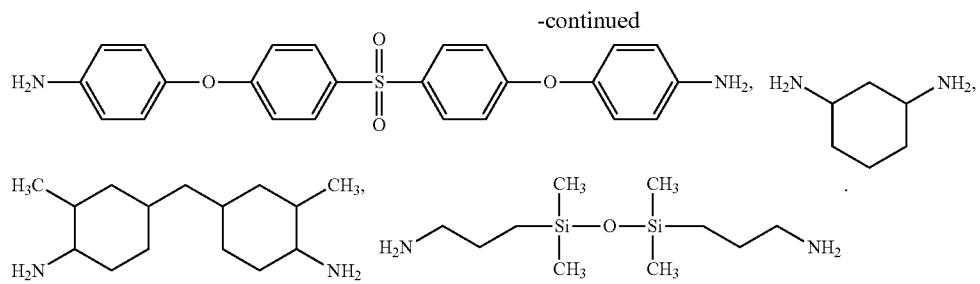

In an embodiment, the optical film may be prepared by coating the amic acid-containing polymer represented by Chemical Formula 1 together with at least one polymerization aid selected from an alkyl phosphite, an aryl phosphite, an alkyl phosphate, and an aryl phosphate and curing the same, and the obtained optical film is an optical film having improved mechanical properties compared to an optical film prepared without adding the polymerization aid.

The optical film may be a free standing film having a thickness of about 10 micrometers to about 120 micrometers.

For example, the optical film may be prepared by polymerizing 3,3',4,4'-biphenyltetracarboxylic dianhydride, 4,4'-(hexafluoroisopropylidene) diphthalic anhydride, or a combination thereof, and 2,2'-bis(trifluoromethyl)benzidine in the presence of triisopropyl phosphite to form the polymerized product, and curing the polymerized product.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 2A is a graph of toughness (megajoules per cubic meter) versus weight percent of TiPPI (percent, %) showing toughness of a poly(amic acid-random-imide) film that is thermoset by heating the same from room temperature to about 215 degrees Centigrade (° C.) at a rate of about 10 degrees Centigrade per minute (° C./min), according to the added amount of the polymerization aid; and FIG. 2B is a graph of toughness (megajoules per cubic meter, MJ/m$^3$) versus weight percent of TiPPI (percent, %) showing toughness of a poly(amic acid-random-imide) film that is thermoset by heating the same from room temperature to about 260° C. at a rate of about 10° C./min. according to the added amount of the polymerization aid;

DETAILED DESCRIPTION

Figure 1:
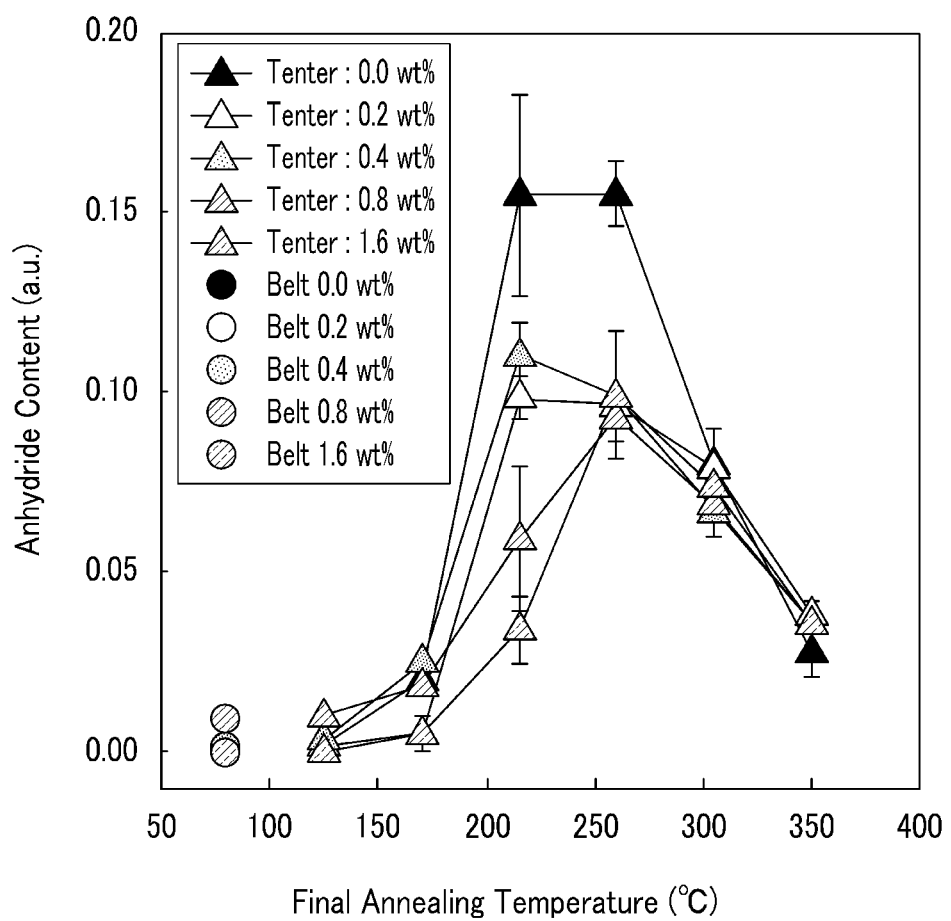
FIG. 1 is a graph of anhydride content (arbitrary units, a. u.) versus final annealing temperature (degrees Centigrade, ° C.) showing a remaining amount of dianhydride according to temperature change and depending upon whether a polymerization aid is added or depending upon the added amount of polymerization aid when the polyimide film is prepared by adding a polymerization aid or by not adding the polymerization aid.

Hereinafter, embodiments are described in detail. However, these embodiments are exemplary, and this disclosure is not limited thereto but rather is defined by the scope of the appended claims.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Additional aspects will be set forth in part in the description which follows and, in part, will be apparent from the description.

As used herein, when a specific definition is not otherwise provided, the term "carbocyclic group" refers to a group formed by a removal of one or more hydrogen atom from a cycloalkane, cycloalkene, or cycloalkyne and having one or more rings and having the specified number of carbon atoms. Non-limiting examples of the carbocyclic groups may include bicyclo[2.2.2]oct-2-ene-5,6,7,8-tetrayl group and 1,2,3,4-tetrahydronaphthalene-1,2,4-triyl group.

As used herein, when a specific definition is not otherwise provided, the term "monocyclic aromatic group" refers to an aromatic system including one aromatic ring and having the specified number of carbon atoms. At least one hydrogen atom in the monocyclic aromatic group may be replaced with a substituent such as a halogen, a haloalkyl group, a nitro group, cyano group, an alkoxy group, and a lower alkylamino group.

As used herein, when a specific definition is not otherwise provided, the term "condensed polycyclic aromatic group" refers to an aromatic group including two or more aromatic rings and having the specified number of carbon atoms, wherein two or more aromatic rings are condensed (i.e., fused) with one another.

As used herein, when a specific definition is not otherwise provided, the term "non-condensed polycyclic aromatic group" refers an aromatic group including two or more aromatic rings linked to each other by a single bond or by a linker and having the specified number of carbon atoms. The linker may be a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —SO$_2$—, —C(=O)—, and —O—. The substituted or unsubstituted cycloalkylene group in the linker may include one or more fused aromatic rings. For example, the substituted or unsubstituted cycloalkylene group in the linker may be a substituted or unsubstituted 9-fluorenylydene group.

As used herein, when a specific definition is not otherwise provided, the term "substituted" refers to a group or compound substituted with one or more substituents selected from a halogen (—F, —Br, —Cl, or —I), a hydroxy group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different and may independently be a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, instead of at least one hydrogen in a functional group, or the substituents may be linked to each other to form a ring.

As used herein, when a specific definition is not otherwise provided, the term "alkyl group" refers to a straight or branched chain saturated aliphatic hydrocarbon having the specified number of carbon atoms, or a C1 to C30 alkyl group, and specifically a C1 to C15 alkyl group, the term "fluoroalkyl group" refers to a straight or branched chain saturated aliphatic hydrocarbon having the specified number of carbon atoms, wherein at least one hydrogen atom is replaced with a fluorine atom, for example a C1 to C30 fluoroalkyl group, or a C1 to C15 fluoroalkyl group, the term "cycloalkyl group" refers to a group having one or more saturated rings in which all ring members are carbon, or to a C3 to C30 cycloalkyl group, for example a C3 to C18 cycloalkyl group, the term "heterocycloalkyl group" refers to a saturated cyclic group containing from 1 to about 3 heteroatoms chosen from N, O, and S, with remaining ring atoms being carbon, the term "alkoxy group" refers to an alkyl group that is linked via an oxygen (i.e., alkyl-O—), specifically C1 to C30 alkoxy group, and specifically a C1 to C18 alkoxy group, the term "cycloalkoxy group" refers to a cycloalkyl group that is linked via an oxygen (i.e., cycloalkyl-O—), specifically a C1 to C30 cycloalkoxy group, and specifically a C1 to C18 cycloalkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to an aromatic group containing only carbon in the aromatic ring or rings, specifically a C6 to C30 aryl group, and specifically a C6 to C18 aryl group, the term "aryloxy group" refers to an aryl group that is linked via an oxygen (i.e., aryl-O—), specifically a C6 to C30 aryloxy group, specifically a C6 to C18 aryloxy group, the term "heteroaryl group" refers to a stable 5- to 7-membered monocyclic or 7- to 10-membered bicyclic heterocyclic ring which contains at least 1 aromatic ring that contains from 1 to 4, or specifically from 1 to 3, heteroatoms chosen from N, O, and S, with remaining ring atoms being carbon, specifically a C2 to C30 heteroaryl group, or for example a C6 to C18 heteroaryl group, the term "alkenyl group" refers to C2 to C30 alkenyl group, and specifically a C2 to C18 alkenyl group, the term "alkylene group" refers to a straight or branched chain, saturated, divalent aliphatic hydrocarbon group, specifically a C1 to C30 alkylene group, and specifically a C1 to C18 alkylene group, the term "cycloalkylene group" refers to a divalent radical formed by the removal of two hydrogen atoms from one or more rings of a cycloalkyl group, specifically a C3 to C30 cycloalkylene group, more specifically a C3 to C18 cycloalkylene group, the term "arylene group" refers to a divalent group formed by the removal of two hydrogen atoms from one or more rings of an arene, wherein the hydrogen atoms may be removed from the same or different rings, specifically a C6 to C30 arylene group, and specifically a C6 to C16 arylene group, the term "heterocycloalkylene group" refers to a divalent saturated cyclic group containing from 1 to about 3 heteroatoms chosen from N, O, and S, with remaining ring atoms being carbon, specifically a C3 to C30 heterocycloalkylene group, more specifically a C3 to C18 heterocycloalkylene group, and the term "heteroarylene group" refers to a stable divalent 5- to 7-membered monocyclic or 7- to 10-membered bicyclic heterocyclic group which contains at least 1 aromatic ring that contains from 1 to 4, or specifically from 1 to 3, heteroatoms chosen from N, O, and S, with remaining ring atoms being carbon, specifically a C2 to C30 heteroarylene group, more specifically a C6 to C18 heteroarylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkenylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkenylene group, the term "aromatic organic group" refers to a C6 to C30 aryl group or a C6 to C30 arylene group, and specifically a C6 to C16 aryl group or a C6 to C16 arylene group, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group that include 1 to 3 heteroatoms selected from O, S, N, P, Si, and a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group that include 1 to 3 heteroatoms selected from O, S, N, P, Si, and a combination thereof in one ring.

As used herein, when specific definition is not otherwise provided, the term "combination" means mixing or copolymerizing.

In addition, in the specification, the mark "*" may refer to where something is connected with the same or different atom or chemical formula.

Furthermore, term "poly(amic acid-random-imide)" refers to a polymer in which amic acid of polyamic acid is partially cured and imidized.

In an embodiment, a method of preparing an optical film includes:

preparing a coating composition including an amic acid-containing polymer represented by the following Chemical Formula 1 and at least one polymerization aid selected from an alkyl phosphite, an aryl phosphite, an alkyl phosphate, and an aryl phosphate;

providing the coating composition on a substrate to form a coating layer; and applying heat to the coating layer to prepare a cured film.

Chemical Formula 1

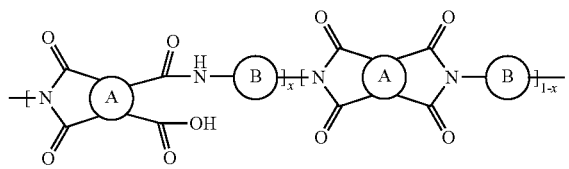

In the above Chemical Formula 1,

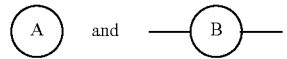

are the same or different in each repeating unit, and are each independently at least one selected from an aromatic organic group, an aliphatic organic group, and an alicyclic organic group, and $0 \leq x \leq 1$.

In an embodiment, in the above Chemical Formula 1, the

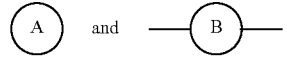

are the same or different in each repeating unit, and are each independently at least one selected from a substituted or unsubstituted C4 to C20 carbocyclic group, a substituted or unsubstituted C6 to C20 monocyclic aromatic group, a substituted or unsubstituted C6 to C20 condensed polycyclic aromatic group, and a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —SO₂—, —C(=O)—, and —O—.

In the above Chemical Formula 1, x may be in a range of $0.05 < x \leq 0.9$, for example $0.2 < x \leq 0.7$.

The polymerization aid may be a trialkyl phosphite, a triaryl phosphite, a trialkyl phosphate, or a triaryl phosphate, for example triisopropyl phosphite ("TiPPI").

The process of preparing an optical film or the like using a polyimide is well known. Particularly, as an aromatic polyimide obtained by polymerizing an aromatic diamine and an aromatic dianhydride has excellent optical properties, mechanical properties, or the like, it is widely used as a material for an optical film, a photoelectric device, and the like.

However, since polyimides have low solubility in a solvent, they may not be directly used as a composition for a film. Accordingly, a polyimide precursor of polyamic acid is synthesized by reacting a diamine and a dianhydride, coating the resultant on a substrate, film-casting, and then finally chemically imidizing or thermally imidizing the product to prepare a polyimide. However, if it is finally imidized by the thermosetting process after film casting using polyamic acid, the molecular weight of the polymer is decreased due to polyamic acid decomposition, so the mechanical properties of the film may be deteriorated during the process, causing an increase in film brittleness during the process. Due to in-plane tension generated in a longitudinal direction or a lateral direction during the film casting process and out-of-tension generated during other following processes, the film is cracked and broken, causing problems in producing the final polyimide film.

In order to solve the problem, reacting a diamine with a dianhydride to prepare polyamic acid and adding a chemical imidizing agent before film-casting the same to be partially imidized, and then preparing the final polyimide film by casting and thermosetting, has been proposed. However, although the molecular weight deterioration caused by directly thermosetting the polyamic acid may be prevented, and thereby mechanical property deterioration of the film may also be somewhat prevented, problems are still present in that the solubility of the polymer in the solvent is deteriorated causing a film casting difficulty at a high ratio of chemical imidization.

A method using an in-line mixer has been proposed to solve the problems. The method may prevent the mechanical property deterioration of the film during the process by reacting the diamine with the dianhydride to provide polyamic acid; adding a chemical imidizing agent just before the film-casting while passing the same through the in-line mixer; and directly film-casting the same so that the polyamic acid film includes the imide at greater than or equal to a predetermined amount before the thermosetting.

However, an additional device such as an in-line mixer increases the process cost, and a phenomenon such as film gelation during the film casting process occurs because of vigorous reactivity due to adding the chemical imidizing agent into the in-line mixer, causing problems in the final film characteristics.

In the method of preparing an optical film according to an embodiment, an additional device such as the in-line mixer or the like is not used, and since the film is prepared using a coating composition by adding the polymerization aid into the amic acid-containing polymer represented by the above Chemical Formula 1, the molecular weight loss of the amic acid-containing polymer represented by the above Chemical Formula 1 may be prevented, such that the obtained final optical film may have improved mechanical properties.

In an embodiment, the method includes polymerizing a diamine with a dianhydride to provide an amic acid-containing polymer represented by above Chemical Formula 1 while preparing the coating composition; and adding at least one polymerization aid selected from an alkyl phosphite, an aryl phosphite, an alkyl phosphate, and an aryl phosphate to the amic acid-containing polymer.

As described above, after preparing the polyamic acid by polymerizing the diamine with the dianhydride and before the thermosetting into a polyimide, when polyamic acid is partially imidized by adding, for example, a chemical imidizing agent, a poly(amic acid-random-imide) polymer may have an amic acid moiety as much as x and an imide moiety as much as (1−x) in one polymer molecule as represented by Chemical Formula 1.

In order words, in the poly(amic acid-random-imide) polymer represented by Chemical Formula 1, the ratio of the imide present in one polymer molecule may be controlled depending upon how the amic acid moiety is cured, according to the adding amount of the chemical imidizing agent, or according to other different methods.

However, even in the case of the poly(amic acid-random-imide), the polyamic acid moiety corresponding to x excepting the imidized moiety is partially cured and imidized as shown in the following Reaction Scheme 1, during the intermediate heat treatment. However, the heat treatment may cause depolymerization in which another part is decomposed again into an anhydride and a diamine, or another part is decomposed into dicarboxylic acid and a diamine.

Reaction Scheme 1

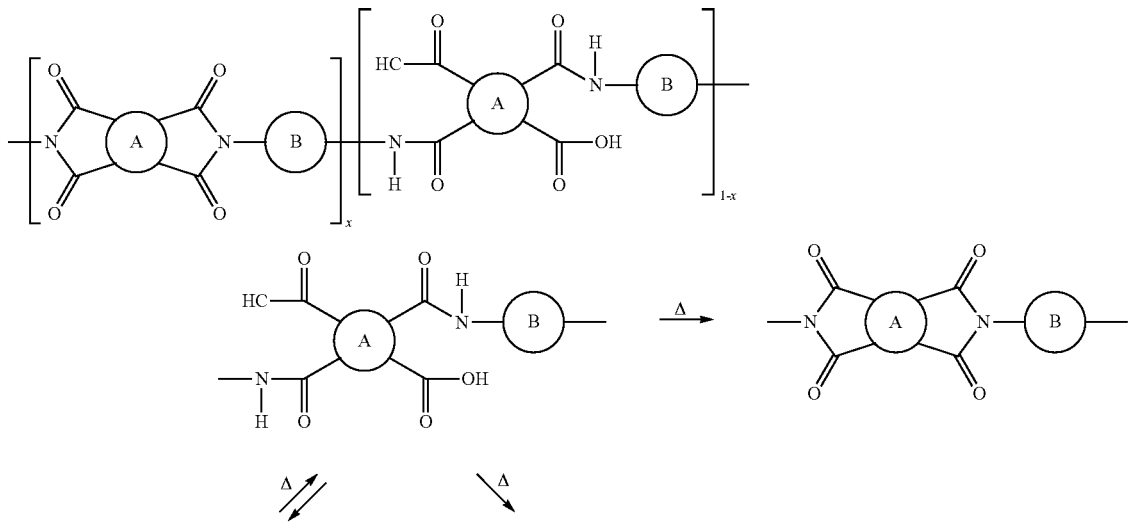

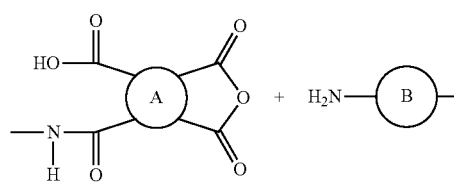
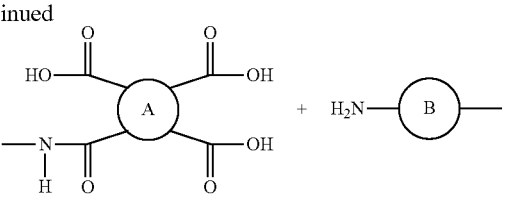

When the depolymerization occurs, the decomposed anhydride and diamine may be polymerized again into amic acid by applying heat and finally converted to an imide, but as the decomposition into dicarboxylic acid and diamine is an irreversible reaction, they are not directly polymerized into amic acid. Instead, the dicarboxylic acid forms an anhydride, and then the anhydride is polymerized with the diamine to prepare the amic acid again.

As above, in the case of adding only a chemical imidizing agent, the molecular weight loss problem may still persist since the poly(amic acid-random-imide) represented by Chemical Formula 1, an intermediate of the process, is decomposed. Although the decomposed anhydride or dicarboxylic acid and diamine may be finally converted into an imide by applying heat, as confirmed in the following examples, when an intermediate of polyamic acid or poly(amic acid-random-imide) is decomposed, the final molecular weight of the polyimide is decreased compared to the case of not decomposing the intermediate, thus mechanical properties of the optical film including the polyimide having the decreased molecular weight may also be deteriorated.

Without being bound to a specific theory, according to an embodiment, it is understood that the molecular weight loss of polyamic acid or poly(amic acid-random-imide) may be suppressed, and thus mechanical properties of the finally produced optical film including polyimide may be improved by adding the polymerization aid after preparing polyamic acid, without adding a chemical imidizing agent, while simultaneously adding the chemical imidizing agent, or after adding the chemical imidizing agent.

The following Reaction Scheme 2 schematically shows the reaction mechanism of suppressing the phenomenon in which the amic acid moiety of the amic acid-containing polymer represented by Chemical Formula 1 is decomposed, by adding an alkyl phosphite or an aryl phosphite as a polymerization aid.

Reaction Scheme 2

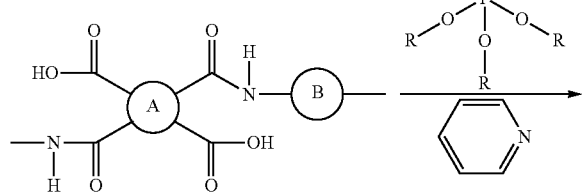
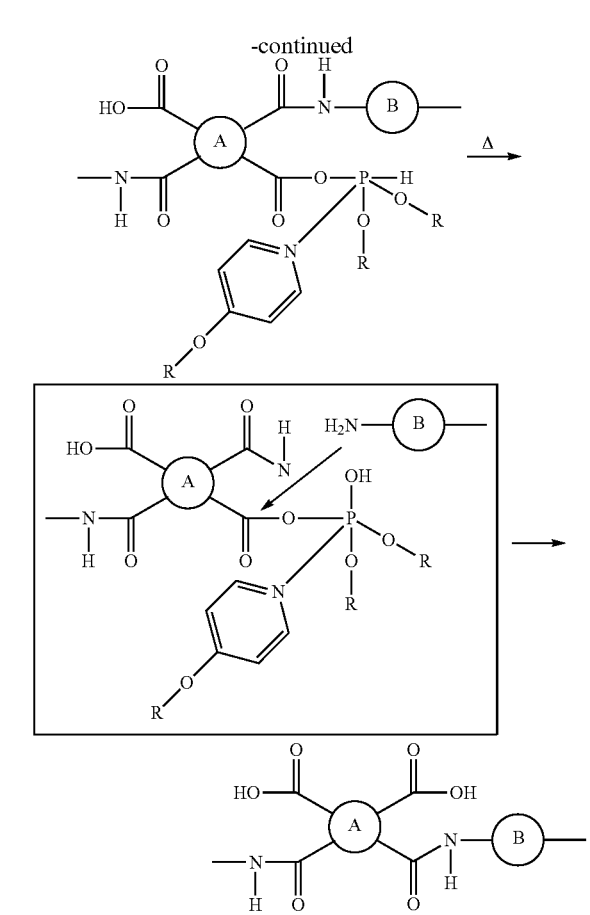

In Reaction Scheme 2, R is an alkyl or aryl.

In other words, if an alkyl phosphite or an aryl phosphite as a polymerization aid is added, an oxygen of a hydroxy group of a carboxyl group moiety of amic acid forms a complex with a phosphorus (P) moiety of the alkyl phosphite or the aryl phosphite. In this case, nitrogen in the diamine to be decomposed from the amic acid by the heat treatment or the like shares its lone pair electrons with a carbon of a carboxyl group bonded with the alkyl phosphite or aryl phosphite and bonded with it, so the morphology of the amic acid moiety to be decomposed is maintained, and thereby the molecular weight loss in the polyamic acid or poly(amic acid-random-imide) process may be remarkably suppressed.

Polyamic acid or poly(amic acid-random-imide) having a molecular weight which is not decreased during the process improves mechanical properties such as toughness compared to that of polyamic acid or poly(amic acid-random-imide) which is decomposed and has a decreased molecular weight, so that it is easier to manufacture a molded article including a polyimide through film casting, drying, and curing.

In addition, polyamic acid or poly(amic acid-random-imide) having a molecular weight which is not decreased may provide a polyimide having a high molecular weight, compared to the decomposed polyamic acid or poly(amic acid-random-imide) having a low molecular weight, when cured to prepare a final polyimide; and a polyimide having increased molecular weight also has improved mechanical properties compared to a polyimide having a low molecular weight.

On the other hand, as described above, the polyimide is not easily dissolved in a solvent, different from the polyamic acid. It is thought that, because a CTC (charge transfer complex) is formed between cured polyimide polymer chains, an opaque polyimide having a high yellow index is provided according to forming a CTC between polyimide polymer chains.

Figure 3:
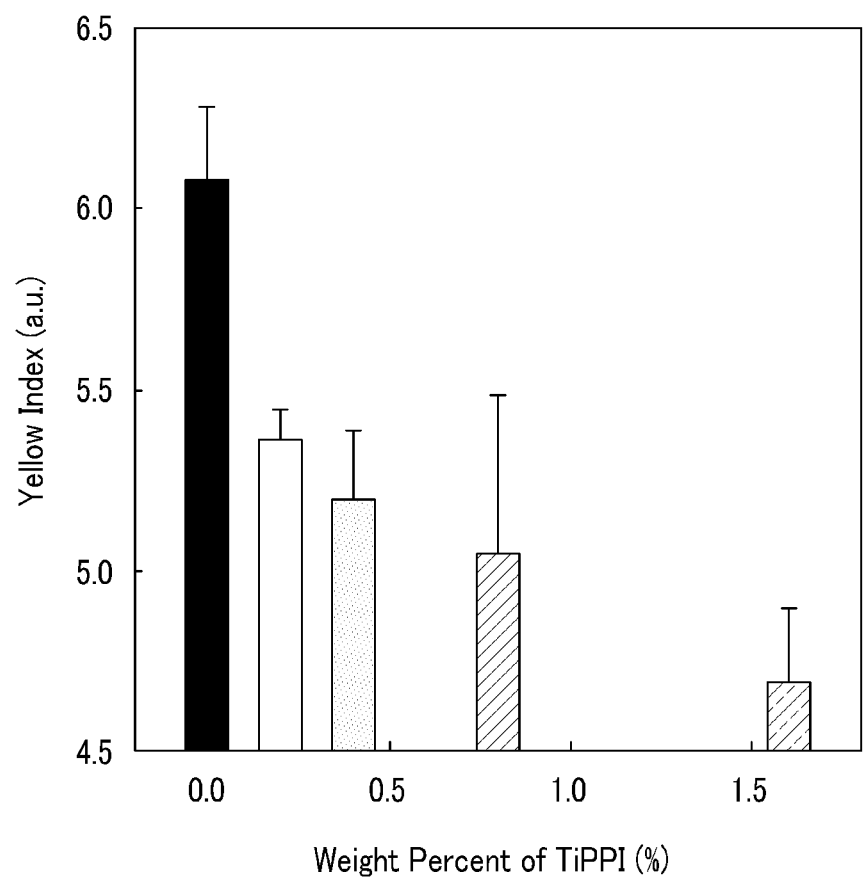
FIG. 3 is a graph of yellow index (arbitrary unit, a. u.) versus weight percent of TiPPI (percent, %) showing the yellow index of a poly(amic acid-random-imide) film depending upon whether the polymerization aid is added, or depending upon the added amount of the polymerization aid when the poly(amic acid-random-imide) film is prepared by adding the polymerization aid or by not adding the polymerization aid.

However, when fabricated by adding a predetermined amount of a polymerization aid according to an embodiment, it is confirmed that the yellow index of a film including polyimide or poly(amic acid-random-imide) is decreased. This phenomenon may be considered to occur since the polymerization aid is inserted between polyimide or poly(amic acid-random-imide) polymers to suppress the formation of the CTC between the polymer molecules. In other words, since the polymerization aid such as alkyl phosphite, aryl phosphite, alkyl phosphate, or aryl phosphate forms a complex with carboxylic acid through phosphorylation, it provides similar effects of introducing a bulky side group to a main chain backbone of partially imidized poly(amic acid-random-imide). Thereby, it is considered that the CTC formation is effectively prevented between partially imidized poly(amic acid-random-imide) or polyimide chains produced therefrom. That is, as shown in FIG. 3, it is estimated that CTC is formed and well packed between poly(amic acid-random-imide) chains to provide a high yellow index when the polymerization aid of triisopropyl phosphite ("TiPPI") is not added; on the other hand, the packing between the poly(amic acid-random-imide) chains is interrupted to suppress the CTC formation when increasing the added amount of TiPPI, and thereby the yellow index is decreased.

On the other hand, as shown in the following examples, it is understood that in preparing the polyimide by polymerizing the diamine and the dianhydride, the molecular weight of a polyimide precursor, which is an amic acid-containing polymer represented by Chemical Formula 1, may be prevented from decreasing by adding the polymerization aid such as TiPPI, so the molecular weight of a polyimide cured from the same is also increased, and thereby the mechanical properties of an optical film including the same is further improved. However, when adding the polymerization aid at more than a predetermined amount, it is found that the polyimide film prepared from the same has deteriorated mechanical properties. It may be considered that the phenomenon is caused by suppressing the CTC formation between polymer chains by adding the polymerization aid such as TiPPI.

Referring to FIG. 2, it is understood that mechanical properties of poly(amic acid-random-imide) prepared by adding a polymerization aid of TiPPI at about 0.0, 0.2, 0.4, 0.8 and 1.6%, respectively, based on the total weight of the polymer, are improved when increasing the amount of TiPPI up to about 0.4 percent by weight ("wt %"). However, when TiPPI is added at about 0.8 wt %, mechanical properties are decreased again. It may be considered that the result is associated with suppressing the CTC formation while preparing the polyimide.

In other words, as described above, when adding the polymerization aid, the decomposition of the amic acid moiety of polyamic acid or poly(amic acid-random-imide) is suppressed such that the molecular weight is increased, so as to play a role of improving mechanical properties of the polymer, but considering the CTC formation, the CTC formation is suppressed when increasing the amount of the polymerization aid, so a polymer is converted to be easily dissolved in a solvent, which negatively affects the mechanical properties. That is, the polymerization aid plays both roles of increasing molecular weight and suppressing CTC formation, which are trade-off effects of mechanical properties of the obtained polymer.

Accordingly, a person of ordinary skill in the art may minimize the molecular weight loss of the polymer and may select a suitable amount of the polymerization aid to produce desirable mechanical properties and transparency considering effects of decreasing mechanical strength according to suppressing CTC formation to prepare an optical film including the polyimide having optimized optical characteristics such as transparency and mechanical properties.

For example, the polymerization aid may be included in an amount of about 0.01 to about 100 mol %, for example about 10 to about 90 mol % based on the total moles of amic acid in the amic acid-containing polymer. However, the added amount of the polymerization aid is not limited thereto, and may be suitably controlled according to the desirable mechanical properties, optical properties, or the like.

On the other hand, in the method of preparing an optical film according to an embodiment, the chemical imidizing agent may be added or not. When the chemical imidizing agent is added, before adding a polymerization aid or simultaneously with adding a polymerization aid while preparing a coating composition, the chemical imidizing agent may be added into a coating composition including the amic acid-containing polymer represented by the above Chemical Formula 1.

The chemical imidizing agent may be included in an amount of less than or equal to about 100 mol %, for example about 0.01 to about 100 mol %, about 10 to about 90 mol %, or about 20 to about 80 mol %, based on the total moles of amic acid in the amic acid-containing polymer. The amount of the chemical imidizing agent is not limited to the range, and may be suitably selected by a person of ordinary skill in the art according to the desirable film properties, process conditions, or the like.

The chemical imidizing agent may be selected from an alkyl acid anhydride and an aryl acid anhydride, for example acetic anhydride.

According to an embodiment, the kind of diamine or dianhydride used for preparing an optical film is not particularly limited, and any diamine or dianhydride that is well known in the art may be used. For example, using an aromatic diamine and an aromatic dianhydride or the like may be preferable, and the aromatic diamine and aromatic dianhydride may also be suitably selected from those well known by a person of ordinary skill in the art.

For example, the diamine used for preparation of the amic acid-containing polymer of the above Chemical Formula 1 may be selected from compounds represented by the following chemical formulae, and combinations thereof.

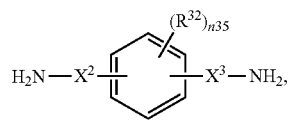

-continued

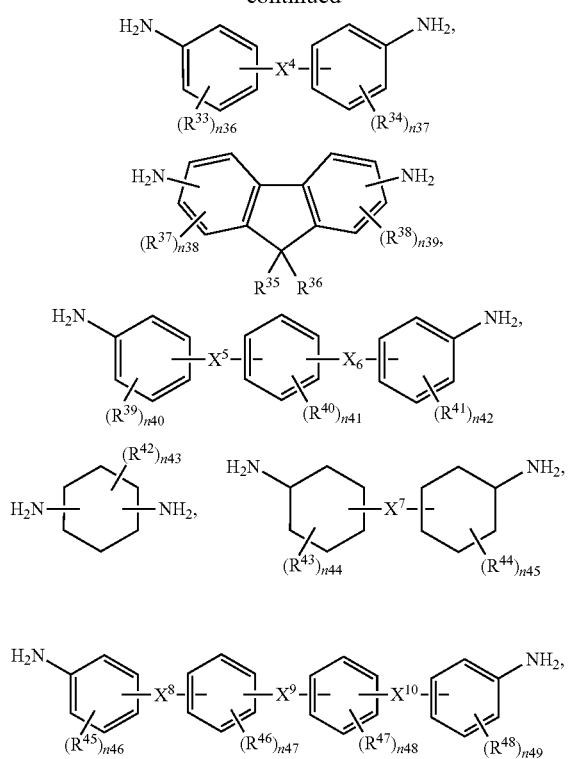

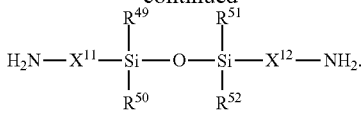

In the above chemical formulae, $R^{32}$ to $R^{52}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different and may each independently be a single bond, a substituted or unsubstituted C1 to C10 alkylene group, a substituted or unsubstituted C1 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —$SO_2$—, —O—, —C(=O)—, or a combination thereof, n35 to n37, and n40 to n49, are integers ranging from 0 to 4, and n38 and n39 are integers ranging from 0 to 3.

For example, the diamine may be selected from compounds represented by the following chemical formulae, and a combination thereof.

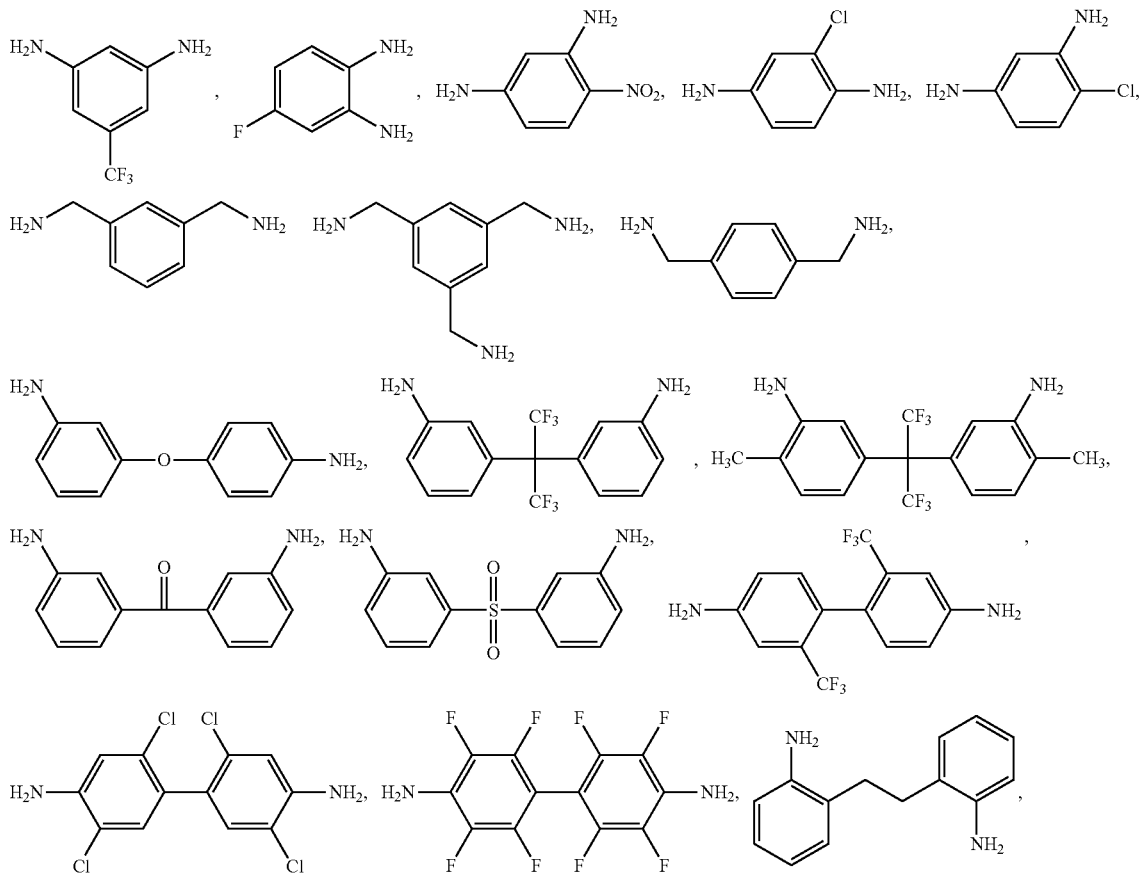

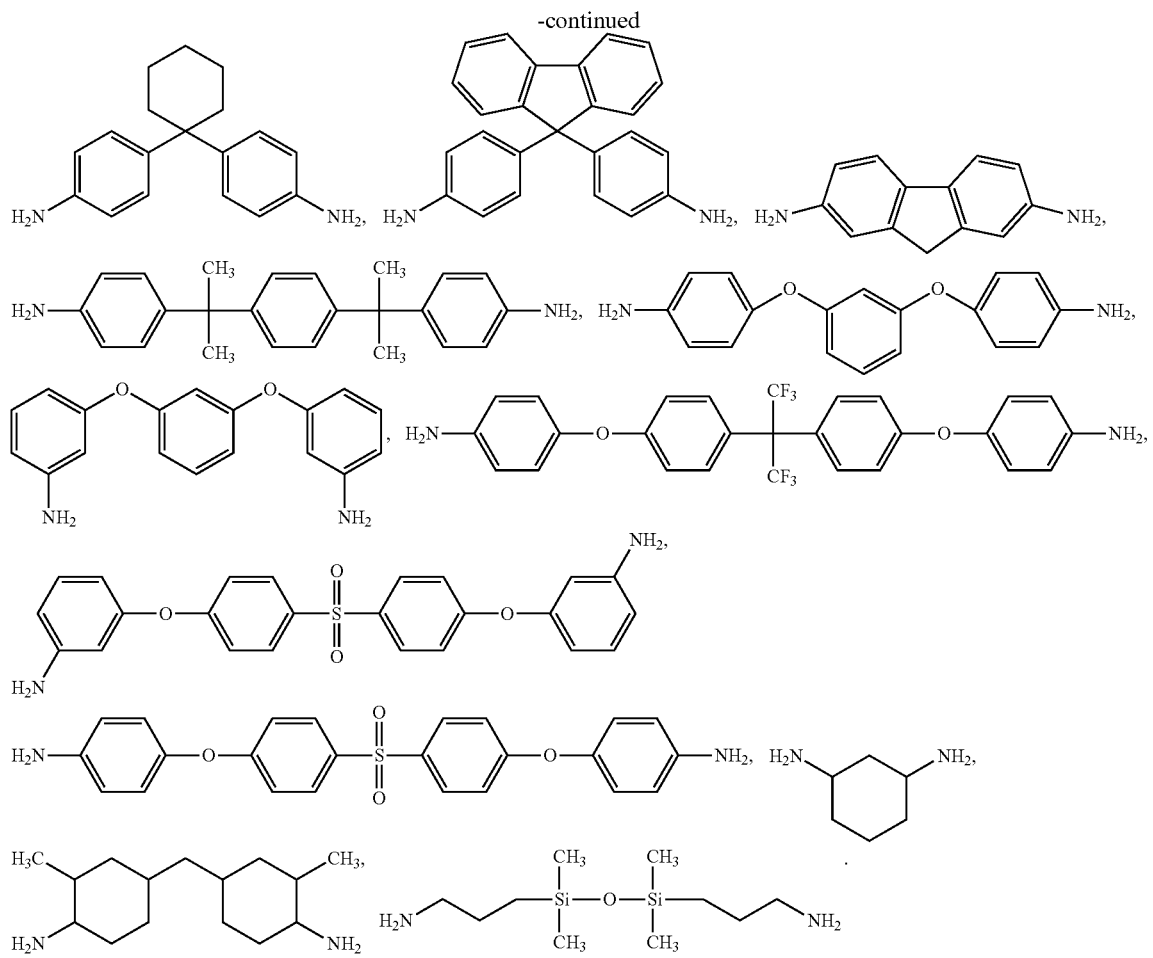

For example, the dianhydride used for preparation of the amic acid-containing polymer of the above Chemical Formula 1 may be represented by the following Chemical Formula 2.

Chemical Formula 2

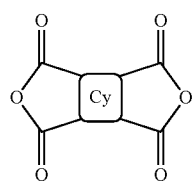

In the above Chemical Formula 2,
Cy is the same as

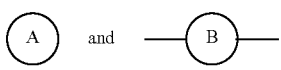

in the above Chemical Formula 1.

For example, the Cy of the above Chemical Formula 2 may be selected from a substituted or unsubstituted C4 to C20 carbocyclic group, a substituted or unsubstituted C6 to C20 monocyclic aromatic group, a substituted or unsubstituted C6 to C20 condensed polycyclic aromatic group, and a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —SO$_2$—, —C(=O)—, and —O—.

The dianhydride represented by the above Chemical Formula 2 may be at least one selected from 3,3',4,4'-biphenyl tetracarboxylic dianhydride ("BPDA"), bicyclo[2.2.2]oct-7-ene-2,3,5,6-tetracarboxylic dianhydride ("BTDA"), 3,3',4,4'-diphenylsulfone tetracarboxylic dianhydride ("DSDA"), 4,4'-(hexafluoroisopropylidene)diphthalic anhydride ("6FDA"), 4,4'-oxydiphthalic anhydride ("ODPA"), pyromellitic dianhydride ("PMDA"), and 4-(2,5-dioxotetrahydrofuran-3-yl)-1,2,3,4-tetrahydronaphthalene-1,2-dicarboxylic anhydride ("DTDA").

In another embodiment, a method of preparing an optical film includes:

preparing a coating composition including the amic acid-containing polymer represented by the above Chemical Formula 1, and at least one polymerization aid selected from an alkyl phosphite, an aryl phosphite, an alkyl phosphate, and an aryl phosphate;

solvent-casting the composition on a belt substrate to form a belt film having an extended length in a length direction of the belt substrate;

separating the belt film from the belt substrate; and applying heat to the belt film to prepare a cured film roll.

In the preparation method, the application of heat to the belt film to prepare a cured film roll may be performed in a state that the belt film is connected to a tenter.

The application of heat to the belt film to prepare a cured film roll may include heating the film at a temperature of about 150° C. to about 500° C., for example, about 300° C. to about 450° C., or for example, about 350° C. to about 400° C., in a state of having the belt film connected to a tenter.

As described above, the method of preparing an optical film according to an embodiment includes solvent-casting a coating composition including the amic acid-containing polymer represented by the above Chemical Formula 1 and the polymerization aid on a belt substrate to provide a belt film, separating the belt film from the belt substrate, and heating and curing the separated belt film to provide a film roll. Therefore, according to the method of preparing an optical film, the film may have sufficient mechanical properties when the solvent casted belt film is separated from the belt substrate without being torn and broken, and the film may have sufficient mechanical properties to be heated and cured by connecting it to the tenter.

According to the method of preparing an optical film according to an embodiment, by including at least one polymerization aid selected from an alkyl phosphite, an aryl phosphite, an alkyl phosphate, and an aryl phosphate together with the amic acid-containing polymer represented by the above Chemical Formula 1 as stated above, the polymerization aid suppresses the molecular weight loss of the amic acid-containing polymer represented by Chemical Formula 1 to improve the mechanical properties of the polymer, so that the belt film may not be torn and broken even if the solvent-casted belt film is separated from the belt substrate. Accordingly, the optical film may have sufficient mechanical properties to heat the belt film in the state of having the belt film connected to a tenter and may also have sufficient mechanical properties until it is heated on the tenter and cured to provide a film roll.

Herein, the polymerization aid and the coating composition including the same are the same as described above, so the detailed description is omitted.

On the other hand, the final heated and cured film is a polyimide film in which all amic acid is imidized in the polymer, and the mechanical properties of the polyimide film are also excellent compared to those of a film obtained from poly(amic acid-random-imide) with no polymerization aid added.

Even though it is depolymerized to decompose the dianhydride and diamine or dicarboxylic acid, the amic acid is bonded again by heating the same at a high temperature, so as to finally obtain a polyimide film. Thereby, even if the molecular weight of the poly(amic acid-random-imide) is somewhat decreased during the intermediate heat treatment, it is generally anticipated that there is no large difference in the molecular weight of the final product film. As understood in the following examples and FIG. 5, according to re-condensing the decomposed diamine and dianhydride into polyamic acid through the intermediate heat treatment by adding the polymerization aid, it is understood that the obtained final polyimide film has further improved mechanical properties compared to the polyimide film prepared from poly(amic acid-random-imide) including no polymerization aid.

Accordingly, another embodiment provides an optical film prepared according to the method so that mechanical properties and optical properties are improved.

According to an embodiment, the optical film may be prepared by coating an amic acid-containing polymer represented by the above Chemical Formula 1 together with at least one polymerization aid selected from an alkyl phosphite, an aryl phosphite, an alkyl phosphate, and an aryl phosphate and curing the same. The obtained optical film may have mechanical properties (for example, toughness) that are higher by about 30% to 70% than the mechanical properties of an optical film prepared by adding no polymerization aid.

For example, the optical film may have toughness of about 60 to about 100 megajoules per cubic meter ("MJ/$m^3$"), or for example about 70 to about 90 MJ/$m^3$.

When the optical film has the mechanical properties, the optical film may be a free standing film which maintains its shape by itself and have a thickness of about 10 micrometers ("μm") to about 120 μm, for example about 30 μm to about 100 μm.

The optical film may have a yellow index of about 0 to about 6, for example 3 to 5.

An optical film having the ranged mechanical properties and yellow index is suitable for a substrate material for an optical display.

For example, the optical film may be prepared by polymerizing 3,3',4,4'-biphenyltetracarboxylic dianhydride ("BPDA"), 4,4'-(hexafluoroisopropylidene) diphthalic anhydride ("6FDA"), or a combination thereof, and 2,2'-bis(trifluoromethyl)benzidine ("TFDB") in the presence of triisopropyl phosphite ("TiPPI"), and curing the resultant.

Hereafter, this disclosure is described in detail with reference to examples. The following examples and comparative examples are not restrictive, but are illustrative.

EXAMPLE

Synthesis Example 1

Synthesis of Partially Imidized Colorless Polyimide ("CLPI")

3,3',4,4'-Biphenyltetracarboxylic dianhydride ("BPDA"), 4,4'-(hexafluoroisopropylidene) diphthalic anhydride ("6FDA"), and 2,2'-bis(trifluoromethyl)benzidine ("TFDB") are vacuum dried at 100° C. overnight. Dimethylacetamide ("DMAc") (2600.00 mL) is input into 3 L reactor (purged with $N_2$) and added with TFDB (164.76 g) and agitated in one direction at 10° C. and at 100 rounds per minute ("rpm") until dissolving TFDB to some degree (through agitation for about 30 minutes). In order to dissolve TFDB which has not been dissolved in the bottom center, it is further agitated at 10° C. while rotating at 300 rpm in one direction for 30 minutes until the TFDB is completely dissolved. BPDA (143.81 g) is input thereto at one time and then agitated at 10° C. and at 100 rpm for 30 minutes in one direction, and it is agitated in one direction for 24 hours after increasing the agitate speed to 300 rpm. After adding 6FDA (11.43 g), it is agitated at 10° C. and at 100 rpm for about 30 minutes while rotating in one direction and further agitated at 300 rpm for about 30 minutes while rotating in one direction to completely dissolve it, and it is then agitated at 100 rpm for 24 hours while rotating in both directions.

In order to increase a polymerization degree by a participating un-reacted monomer, which has not participated in the reaction due to the mixing imbalance due to a high viscosity, into the reaction, DMAc is added to lower the viscosity, so as to control the polymerization degree. If the viscosity is stabilized by approaching an approximate maximum point, small amount of DMAc is added to decrease the viscosity to less than or equal to 100,000 centipoise ("cPs") (consuming in about 1-2 days).

Then a mixed solution of acetic anhydride (41.5 mL), pyridine (35.43 mL), and DMAc (78.00 mL) is agitated in both directions at 100 rpm for 24 hours while being slowly added using a dropping funnel to perform chemical imidization ("CI") (goal imidization degree=60%). The viscosity increased by the chemical imidization is lowered by adding a small amount of DMAc, so the viscosity is decreased to around 150,000 cPs to finally prepare a partially imidized colorless polyimide/DMAc solution. The obtained solution is stored in a refrigerator for viscosity stability.

The synthesis process is schematically shown in the following Reaction Scheme 3.

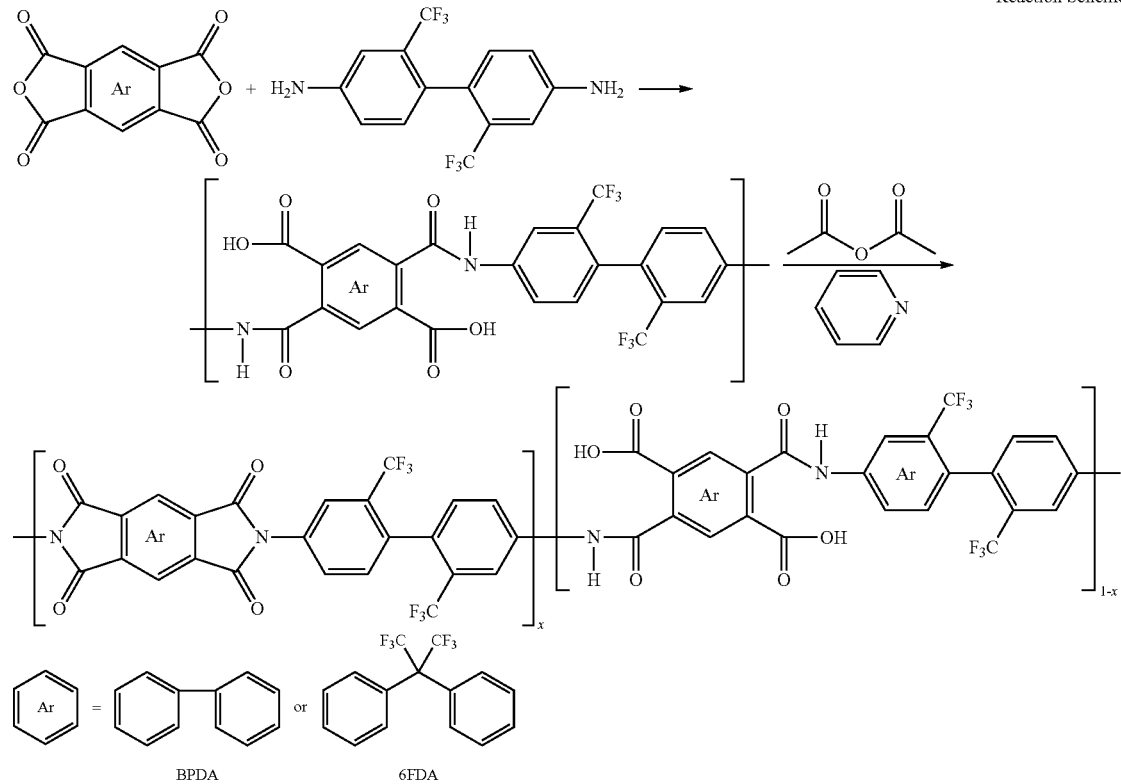

Reaction Scheme 3

In the obtained partially imidized colorless polyimide, which is poly(amic acid-random-imide), the mole ratio x of chemically imidized imide is about 0.6.

Example 1

Preparation of Mixture of Partially Imidized Colorless Polyimide and Polymerization Aid of Triisopropyl Phosphite ("TiPPI")

In the case of about 60% of the chemically imidized colorless polyimide (hereinafter referred to as "CLPI60", the compound represented by the following Chemical Formula 3), about 40% of each polymer molecule has a form of amic acid, so carboxylic acid capable of participating in the additional reaction exists in about 40% of each polymer molecule.

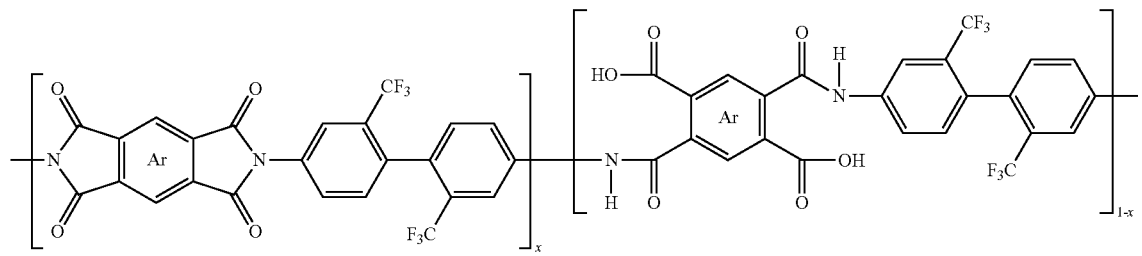

Chemical Formula 3

The mole ratio of triisopropyl phosphite ("TiPPI") represented by the following Chemical Formula 4 is calculated to be reacted with each at 0%, 10%, 20%, 30%, and 40% of the 40% un-reacted carboxyl group, considering the mole ratio of the un-reacted carboxyl group in the polymer. The mole ratio is exchanged to the amount based on the total weight of solution of the partially imidized polyimide CLPI60 obtained from Synthesis Example 1 and a DMAc solvent. TiPPI is added at about 0 wt %, 0.2 wt %, 0.4 wt %, 0.8 wt %, and 1.6 wt %, respectively, based on the total weight of the solution to provide TiPPI mixtures having different amounts of CLPI60 from each other.

Chemical Formula 4

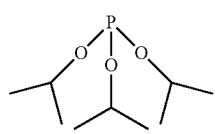

Example 2

Preparation of Poly(amic acid-random-imide) or Polyimide Film

After adjusting a gap of a doctor blade to 800 and a speed of 5 mm/s, the mixture of TiPPI and CLPI60 obtained from Example 1 is coated on a glass plate to provide a film. Then it is heated on a hot plate set at 80° C. for 30 minutes to first-dry each film. Then the film is torn off from the glass substrate, and then connected to a tenter and heated in a furnace at a heating speed of 10° C./minute from room temperature to 125° C., 170° C., 215° C., 260° C., 305° C., and 350° C. to provide a film heat-treated to each temperature range.

In addition, in order to evaluate the final properties, it is heated at a heating speed of 10° C./minute from room temperature to 350° C. and undergoes isothermal treatment at 350° C. for 30 minutes to prepare a required film. In order to imitate the real process, for convenience, the film separated from the glass substrate is referred to as a belt film and the film heat-treated in a furnace is referred to as a tenter film. The tenter film has a thickness of about 45 μm.

Evaluation Example 1

Evaluation of Properties of Intermediate Heat-Treated Poly(Amic Acid-Random-Imide) Film For evaluating properties of films obtained from each heating treatment condition, FT-IR spectroscopy, photospectroscopy, and an Instron machine are used.

Using ATR (attenuated total reflectance) IR, which is one of FT-IR spectroscopy measuring methods, the amount of residual dianhydride is measured. The amount of residual dianhydride is obtained by normalizing an area corresponding to an anhydride band using the area corresponding to C—F bond band. In other words, the area of an anhydride stretching band peak shown at 1855 reverse centimeters ("cm$^{-1}$") is calculated by normalizing the same as the area of a C—F stretching band peak shown at 1250 cm$^{-1}$. The calculated amount of residual dianhydride is converted for a function of thermosetting conditions, and the results are shown in the graph of FIG. 1. In FIG. 1, each value is determined by an average of measured values of each of 4 samples.

Polyamic acid may cause depolymerization in which an amic acid moiety is decomposed into an anhydride moiety and diamine according to increasing a temperature of heat treatment. Depolymerization may include a process of decomposing amic acid to original dianhydride and diamine again, and may include a process of reacting water contained as an impurity or water generated as a side product of thermal imidization with amic acid and decomposing it into dicarboxylic acid and an amine. In the latter case, dicarboxylic acid may be converted into dianhydride again according to increasing the heat treatment temperature, so the amount of residual dianhydride may be considered as an index of measuring how much is depolymerized.

As shown in FIG. 1, regardless of the added amount of TiPP in the belt film, the amount of residual dianhydride is similar. However, when increasing the temperature of the heat treatment condition for preparing a tenter film to a high temperature, the amount of residual dianhydride is sharply increased, so thereby it is understood that depolymerization has occurred. However, it is found that the amount of residual dianhydride is decreased again when approaching the heat treatment condition of the tenter to a higher temperature. This may be explained as the dianhydride receiving sufficient active energy and again reacting with the amine and being consumed due to the high temperature.

On the other hand, looking at the region of about 200° C. to about 250° C. in FIG. 1, the tendency of increasing the amount of dianhydride is generally similar, but it is observed that the amount of residual dianhydride is rapidly decreased when increasing the added amount of TiPPI. This may be because, while the carboxyl group of the amic acid is activated by phosphorylation due to TiPPI, the amine separated by depolymerization again participates in the reaction, so what is to be decomposed into dianhydride and diamine is returned to amic acid again. Resultantly, it is understood that, if TiPPI is present, even if it is depolymerized, a re-condensation reaction is induced through phosphorylation to suppress the serious decrease phenomenon of the molecular weight.

Figure 2A:
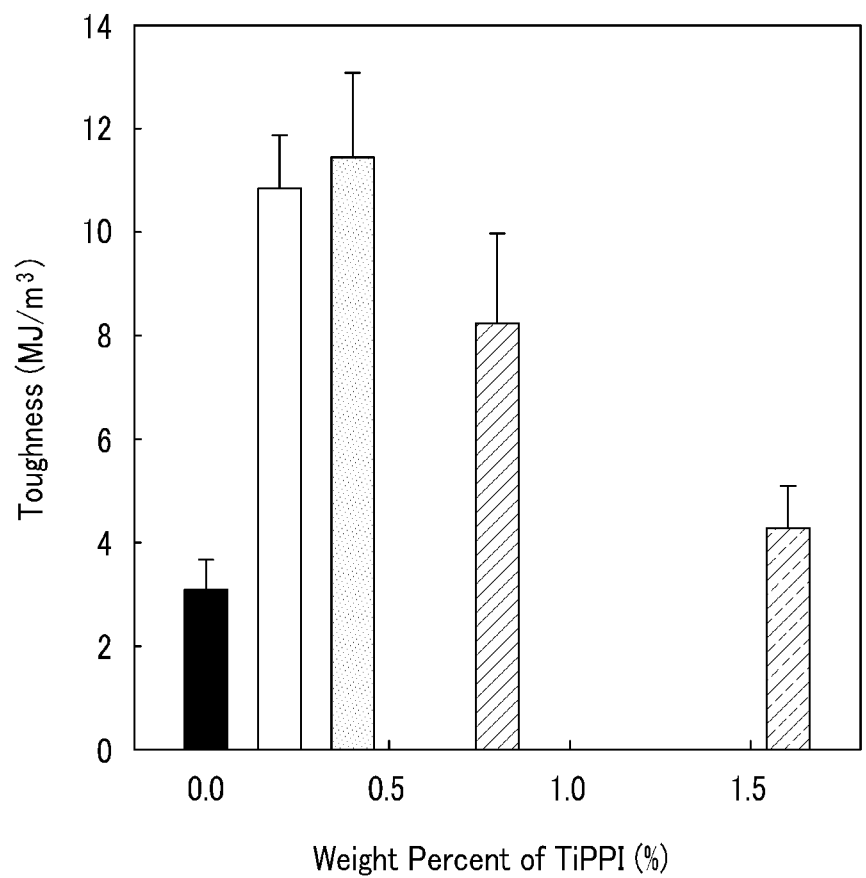
FIGS. 2A and 2B are graphs of toughness (megajoules per cubic meter, MJ/m$^3$) versus weight percent of TiPPI (percent, %) showing mechanical properties (toughness) after thermosetting a poly(amic acid-random-imide) film prepared by adding a polymerization aid or by not adding the polymerization aid.
Figure 2B:
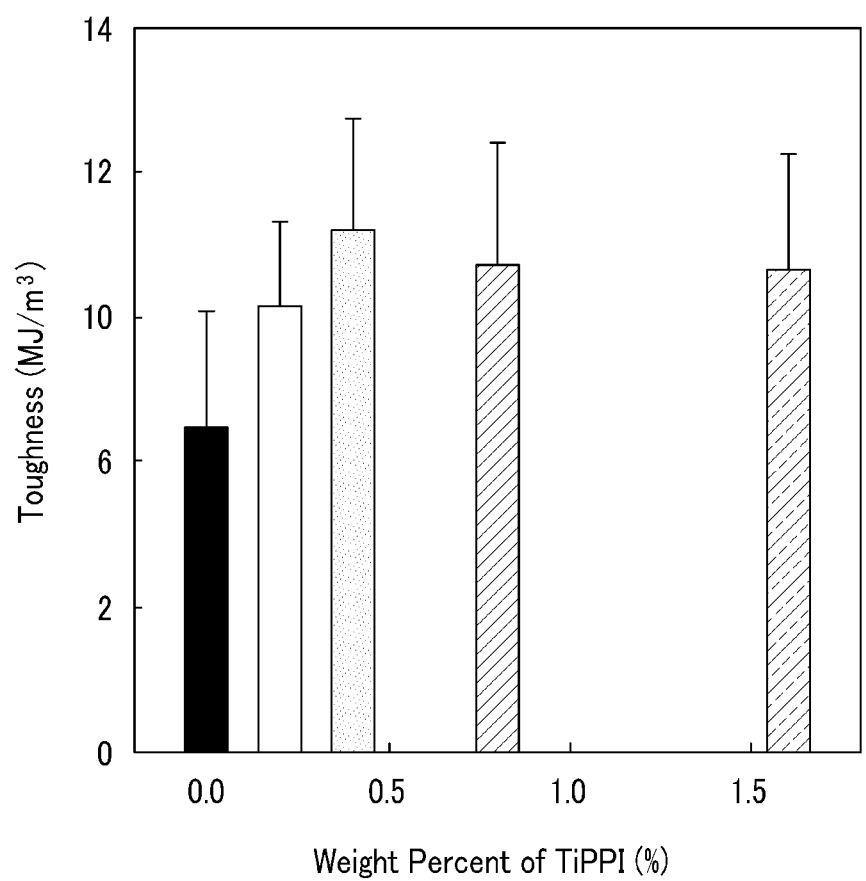

On the other hand, if is heated in a tenter during the real process, tension is applied in the film progressing direction (MD direction), and tension is also applied in a direction (TD direction) perpendicular to the film progressing direction by stretching in the tenter. Accordingly, if mechanical properties are deteriorated according to decreasing molecular weight by depolymerization, serious problems in the process are caused in the tenter. In the 200-250° C. range where it is actively depolymerized, in order to find whether the property deterioration is controlled by phosphorylation, toughness of the obtained film sample is measured using an Instron machine, and the results are shown in FIG. 2A and FIG. 2B. Toughness is measured at a speed of about 25 millimeters ("mm") per minute using a universal tensile machine ("UTM") after preparing each specimen having a rectangular geometry, with a width of 4.62 mm and a length of 6.35 mm according to ASTM D638.

FIG. 2A shows a toughness of the film that is heated from room temperature to 215° C. at a speed of 10° C./minute and cured; FIG. 2B shows mechanical properties of the film that is heated from room temperature to 260° C. at a speed of 10° C./minute and cured. In this case, each value shown in the graphs of FIG. 2A and FIG. 2B is an average of values measured from 4-6 samples remaining from the values of 6 to 8 samples excepting the maximum value and the minimum value.

As shown in FIG. 2A and FIG. 2B, it is understood that the thermoset film having undergone phosphorylation has higher mechanical properties due to TiPPI than those of the film added with no TiPPI. This may be considered to be because the mechanical property deterioration of the film is prevented by suppressing molecular weight loss due to re-condensation through TiPPI phosphorylation.

On the other hand, when increasing the added amount of TiPPI, toughness is increased, but the mechanical properties are deteriorated again if increasing by more than a predetermined added amount. In order to explain the phenomenon, the yellow index is measured using a spectrophotometer. Samples are selected from films heated from room temperature to 215° C. at a heating speed of 10° C./min, at which they are most actively depolymerized, and the TiPPI amounts added to each sample are different from each other. Each value is obtained by averaging 2 samples from each of 4 samples excepting the maximum value and the minimum value, and the results are shown in FIG. 3.

From FIG. 3, it is observed that the yellow index of the film added with TiPPI is rapidly decreased when increasing the added amount of TiPPI, compared to the film added with no TiPPI. Generally, the yellow index of the polyimide system is closely related with forming a CTC (charge transfer complex). From the yellow index results, it is considered that, by forming a complex of TiPPI with carboxylic acid through a phosphorylation reaction, it provides the same effects as a bulky side group introduced into a main backbone of partially imidized poly(amic acid-random-imide), and thereby it is considered that CTC formation between partially imidized poly(amic acid-random-imide) chains may be effectively suppressed. In other words, as shown in FIG. 3, it is considered that, because packing between poly(amic acid-random-imide) chains is interfered with when increasing the added amount of TiPPI, CTC formation is suppressed to decrease the yellow index.

As TiPPI forms a complex with a polymer chain through phosphorylation by introducing TiPPI, in order to further confirm that it affects inter-chain packing by the steric hindrance due to bulkiness, the thermoset and partially imidized poly(amic acid-random-imide) film is measured with a solubility test of dimethyl acetamide ("DMAc").

As shown in the following Table 1, the solubility results of poly(amic acid-random-imide) film for DMAc heat-treated at a heating speed of 10° C./min from room temperature to 215° C. are different according to the added amount of TiPPI.

TABLE 1

| Amount of TiPPI | Solubility for DMAc |
| --- | --- |
| 0.0 wt % | Insoluble |
| 0.2 wt % | Partially dissolved |
| 0.4 wt % | Partially dissolved |
| 0.8 wt % | Dissolved |
| 1.6 wt % | Dissolved |

As shown in Table 1, the film added with no TiPPI is not dissolved in DMAc. However, when increasing the added amount of TiPPI, it is partially dissolved; and when TiPPI is added more than or equal to the predetermined amount, the film is completely dissolved in the solvent.

From the yellow index results, it is understood that TiPPI forms a complex with the carboxyl group of the amic acid to interfere with the packing between polymer chains. If the inter-chain packing is closely made, the solubility of the polymer film in the solvent is deteriorated, and if the inter-chain packing is loosely made, the solubility to the solvent is enhanced.

Figure 4A:
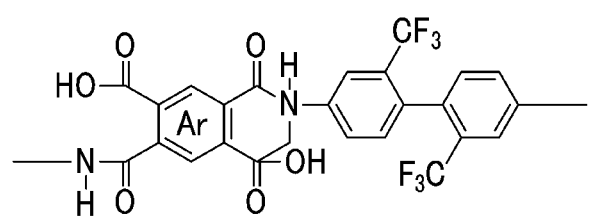
FIGS. 4A and 4B are schematic views showing that the polymerization aid used in an embodiment affects the transparency or mechanical properties of a poly(amic acid-random-imide) film.
Figure 4A:
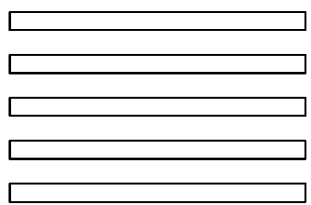
Figure 4B:
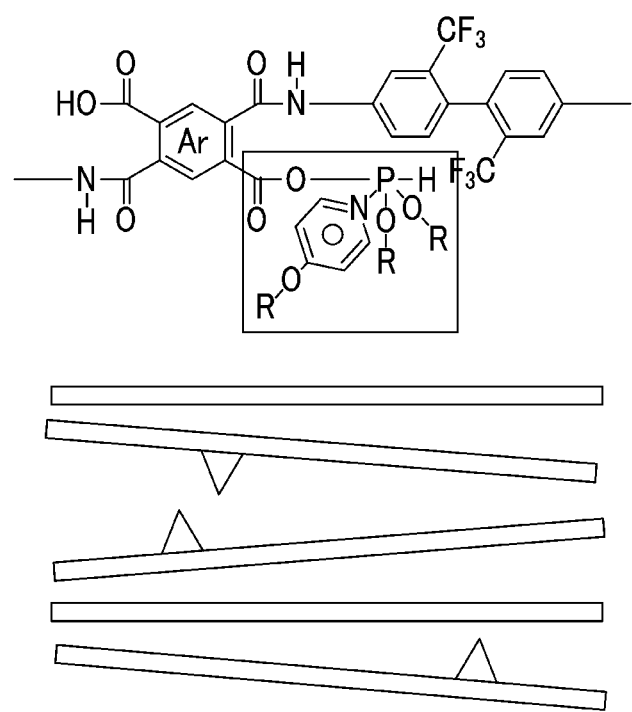

Based on the results, FIGS. 4A and 4B schematically show the entire molecular structure between the partially imidized poly(amic acid-random-imide) film and TiPPI molecules added to the polymer.

In other words, FIG. 4A shows a structure having only pure polyamic acid or poly(amic acid-random-imide) film without adding TiPPI, and FIG. 4B shows a structure of loose inter-chain packing since TiPPI forms a complex with the carboxyl group of the amic acid by adding TiPPI to the polymer. Thereby, as TiPPI forms a complex with the carboxyl group of the amic acid through phosphorylation, inter-chain packing is interfered with, and resultantly, it is considered to bring effects of decreasing the yellow index and increasing the solubility in a solvent.

With the results together, it may be explained why mechanical properties, for example toughness, are increased according to increasing the added amount of TiPPI, but the mechanical properties are decreased again when the added amount is over a predetermined amount. From the amount results of residual dianhydride, it is understood that the recondensation is accelerated through phosphorylation when adding TiPPI, so it provides positive effects on mechanical properties by blocking the molecular weight decrease. On the other hand, if TiPPI forms a complex with carboxylic acid of the amic acid through phosphorylation to increase bulkiness, the packing density of the polymer is decreased to provide negative effects on mechanical properties. Due to the trade-off relationship between the molecular weight and the inter-chain packing density, the polymer film may have suitable mechanical strength and transparency by adjusting the added amount of TiPPI.

Evaluation Example 2

Evaluation of Mechanical Properties of Polyimide Film

Through the results of Evaluation Example 1, it is understood that the mechanical properties of the partially imidized poly(amic acid-random-imide) film added with TiPPI are increased.

By heat-treating the poly(amic acid-random-imide) film having improved intermediate properties through phosphorylation due to TiPPI, the final polyimide film in which all of the amic acid moiety is converted to imide is measured for mechanical properties (toughness). After connecting the belt films having different amounts of TiPPI to a tenter, they are heat-treated from room temperature to 350° C. at a heating speed of 10° C./min, and then isothermally cured at 350° C. for 30 minutes to provide a final polyimide film, and the toughness thereof is measured.

Figure 5:
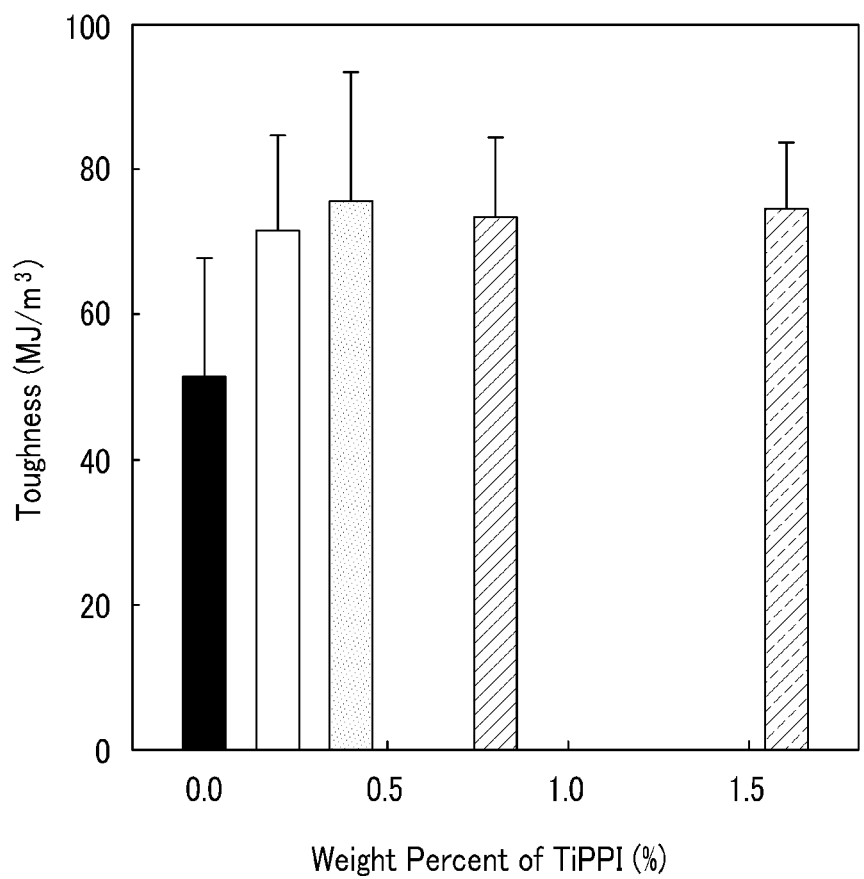
FIG. 5 is a graph of toughness (megajoules per cubic meter) versus weight percent of TiPPI (percent, %) showing mechanical properties (toughness) of a polyimide film according to whether the polymerization aid is added, or according to the added amount of the polymerization aid when the polyimide film is prepared by final thermosetting of a poly(amic acid-random-imide) film prepared by adding the polymerization aid or not adding the polymerization aid in a tenter.

As shown in FIG. 5, it is understood that the film added with TiPPI has generally higher mechanical properties than the film added with no TiPPI. Each value of the graph in FIG. 5 is obtained by averaging 4 to 6 samples excepting the maximum value and the minimum value from 6 to 8 samples.

Even if decomposed into anhydride and amine or decomposed into dicarboxylic acid and amine by being depolymerized during the intermediate heat treatment, the amic acid bond reoccurs to prepare polyamic acid by heating at a high temperature, and finally poly(amic acid-random-imide) is converted into polyimide, so it is generally considered that the molecular weight of the final product has no largely different molecular weight even if the molecular weight is decreased during the intermediate heat treatment process. However, FIG. 5 shows that even better mechanical properties may be provided when the polyimide film is prepared by final heat-treating the sample having high mechanical properties in the trade-off relationship of molecular weight and polymer packing density during the intermediate heat-treatment through phosphorylation of TiPPI.

Accordingly, when the polyimide film is prepared according to an embodiment, it is heat-treated by adding a polymerization aid such as TiPPI even if added with no chemical imidizing agent or added with a chemical imidizing agent, so it may suppress the molecular weight decrease of polyamic acid or poly(amic acid-random-imide), and the polyamic acid or poly(amic acid-random-imide) film in which the molecular weight loss is suppressed in this way is very preferable for the following film preparing process due to the mechanical property improvement. In other words, the film may be present as a standing film which may maintain its shape by itself and have a predetermined thickness by enhancing mechanical properties, so it may be very preferable for the following film preparing process. In addition, it is understood that the polyimide film may have further enhanced mechanical properties when the polyimide film is prepared using polyamic acid or the poly(amic acid-random-imide) film in which the molecular weight is increased.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of preparing an optical film, the method comprising:
   preparing a coating composition comprising an imide and amic acid-containing random copolymer represented by Chemical Formula 1, the coating composition further comprising at least one polymerization aid selected from an alkyl phosphite, an aryl phosphite, an alkyl phosphate, and an aryl phosphate;
   providing the coating composition on a substrate to form a coating layer; and
   applying heat to cure the coating layer into a cured film, wherein Chemical Formula 1 has the following structure:

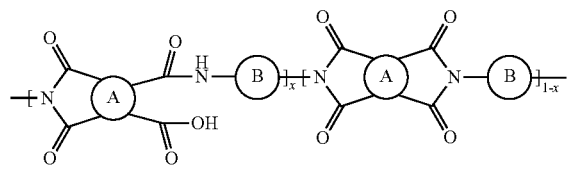

and wherein, in Chemical Formula 1,

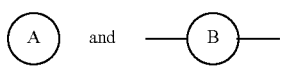

are the same or different in each repeating unit, and are each independently selected from at least one of an aromatic organic group, an aliphatic organic group, and an alicyclic organic group, and
0<x<1.

2. The method of claim 1, wherein the coating composition further comprises a chemical imidizing agent selected from an alkyl acid anhydride and an aryl acid anhydride.

3. The method of claim 2, wherein the polymerization aid in the coating composition is included in an amount of about 0.01 to about 100 mol % based on the total moles of amic acid in the imide and amic acid-containing random copolymer, and the chemical imidizing agent in the coating composition is included in an amount of about 0.01 to about 100 mol % based on the total moles of amic acid in the imide and amic acid-containing random copolymer.

4. The method of claim 2, wherein the chemical imidizing agent is acetic anhydride.

5. The method of claim 1, wherein the

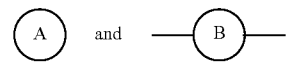

of Chemical Formula 1 are the same or different in each repeating unit, and are each independently selected from at least one of a substituted or unsubstituted C4 to C20 carbocyclic group, a substituted or unsubstituted C6 to C20 monocyclic aromatic group, a substituted or unsubstituted C6 to C20 condensed polycyclic aromatic group, and a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —SO₂—, —C(=O)—, and —O—.

6. The method of claim 1, wherein, in Chemical Formula 1, 0.05<x≤0.9.

7. The method of claim 1, wherein the polymerization aid is triisopropyl phosphite.

8. The method of claim 1, wherein the preparing of the coating composition further comprises reacting a diamine with a dianhydride to form the imide and amic acid-containing random copolymer represented by Chemical Formula 1, and adding the polymerization aid to the formed imide and amic acid-containing random copolymer.

9. The method of claim 8, wherein the preparing of the coating composition further comprises adding a chemical imidizing agent selected from an alkyl acid anhydride and an aryl acid anhydride before the adding of the polymerization aid or upon the adding of the polymerization aid.

10. The method of claim 8, wherein the diamine is selected from compounds represented by the following chemical formulae or a combination thereof:

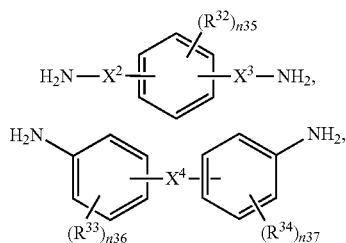

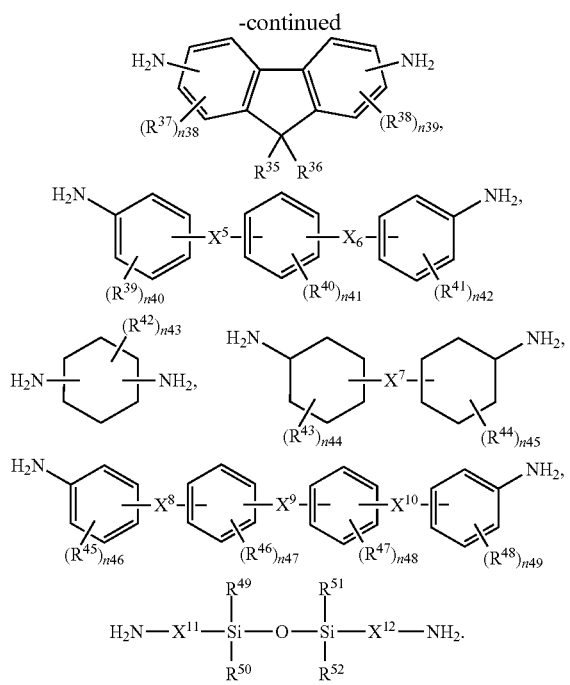

wherein, in the chemical formulae, $R^{32}$ to $R^{52}$ are the same or different and are each independently hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different and is each independently a single bond, a substituted or unsubstituted C1 to C10 alkylene group, a substituted or unsubstituted C1 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —$SO_2$—, —O—, —C(=O)—, or a combination thereof, n35 to n37 and n40 to n49, are integers ranging from 0 to 4, and n38 and n39 are integers ranging from 0 to 3.

11. The method of claim 10, wherein the diamine is selected from compounds represented by the following chemical formulae or a combination thereof:

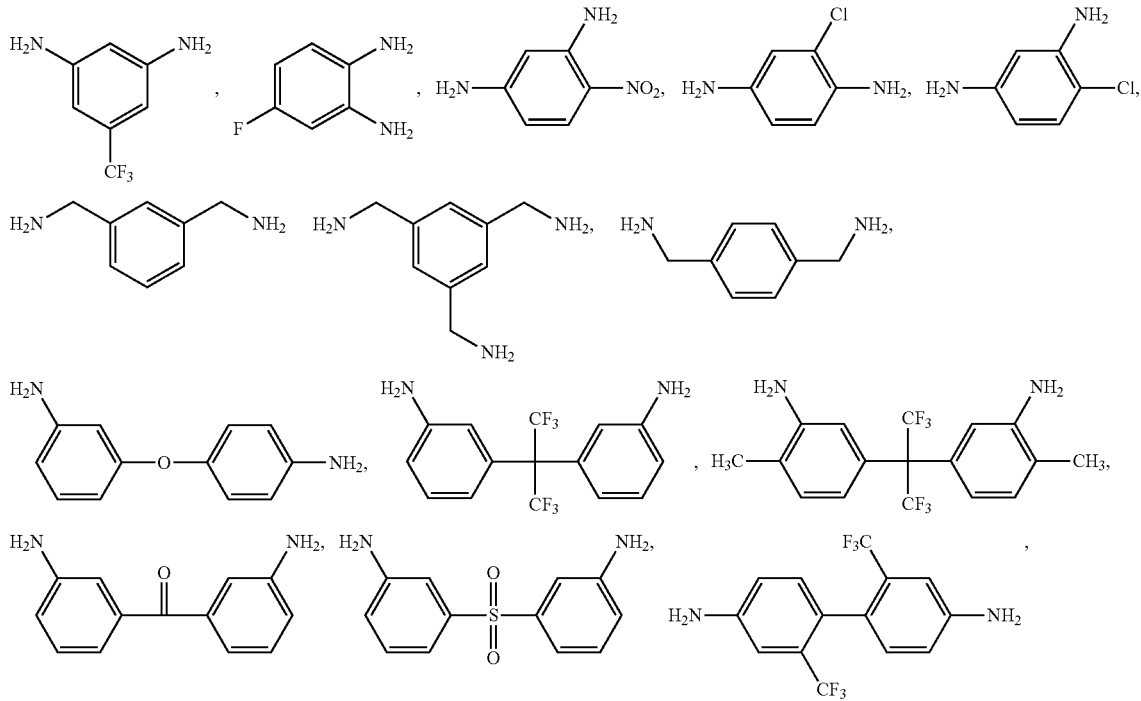

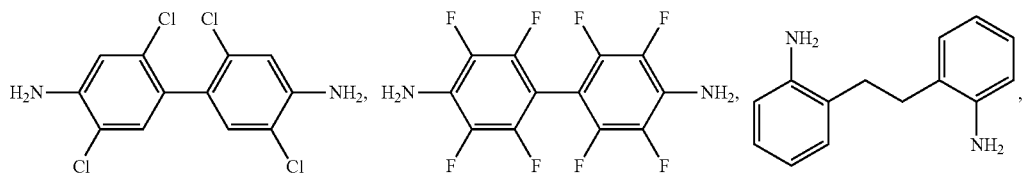

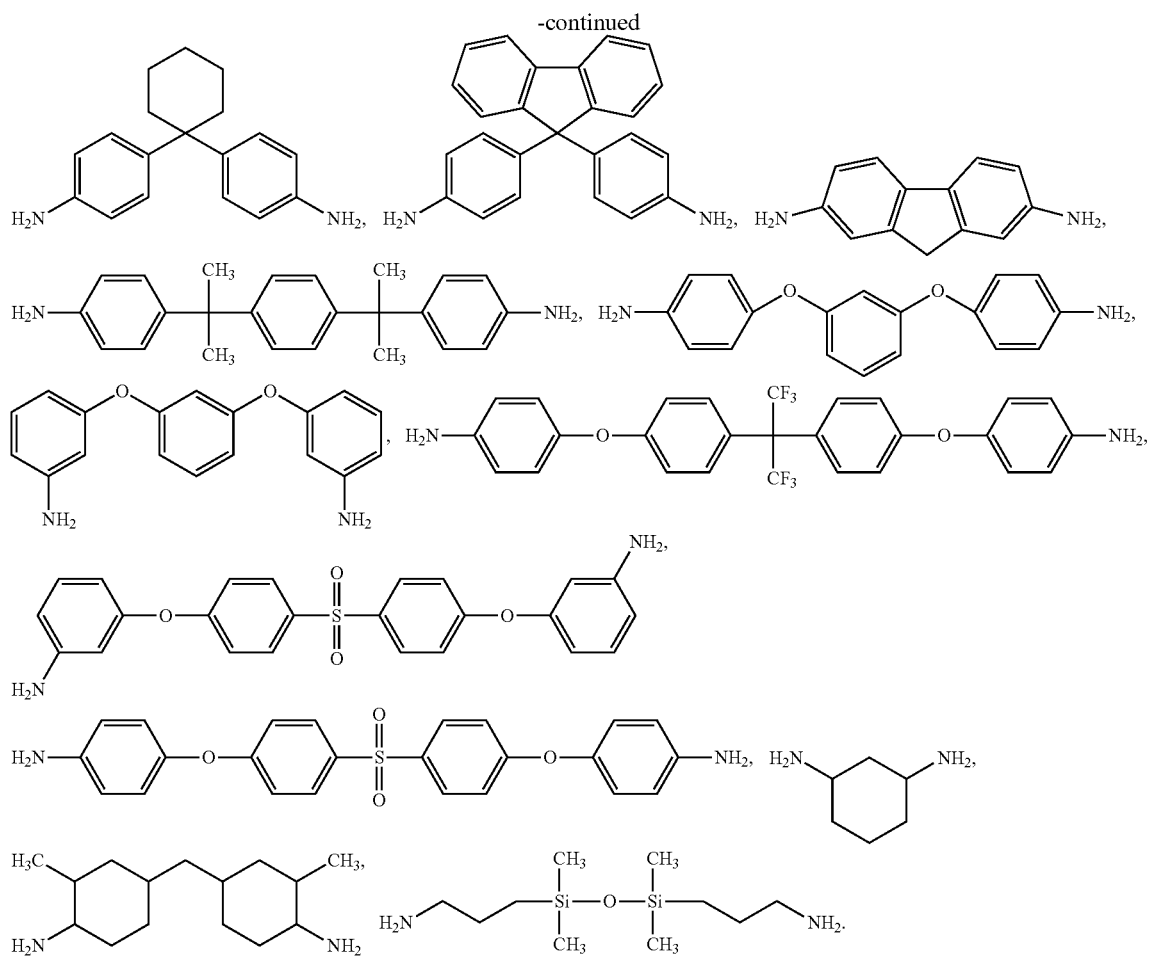

12. The method of claim 8, wherein the dianhydride is represented by Chemical Formula 2:

wherein Chemical Formula 2 has the following structure:

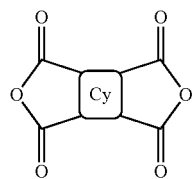

wherein, in Chemical Formula 2,

Cy is a substituted or unsubstituted C4 to C20 carbocyclic group, a substituted or unsubstituted C6 to C20 monocyclic aromatic group, a substituted or unsubstituted C6 to C20 condensed polycyclic aromatic group, or a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —$SO_2$—, —C(=O)—, and —O—.

13. The method of claim 12, wherein the dianhydride is selected from at least one of 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride.

14. The method of claim 1,
wherein the providing of the coating composition on the substrate to form the coating layer comprises solvent-casting the composition on a belt substrate to form a belt film in a direction of the belt substrate, and then separating the belt film from the belt substrate, and
wherein the applying of heat to cure the coating layer comprises applying heat to cure the belt film into a cured film roll.

15. The method of claim 14,
wherein the applying of heat to cure the belt film into cured film roll is performed in a state where the belt film is connected to a tenter.

16. The method of claim 15,
wherein the applying of heat to cure the belt film into cured film roll comprises applying heat to the belt film in a temperature range of about 150° C. to about 500° C. while the belt film is connected to the tenter.

* * * * *